US009727808B1

(12) United States Patent
Nakahara et al.

(10) Patent No.: US 9,727,808 B1
(45) Date of Patent: Aug. 8, 2017

(54) METHOD AND SYSTEM FOR RENDERING RECTANGLE DRAWING OBJECTS USING A CLIP REGION

(71) Applicant: KYOCERA Document Solutions Inc., Osaka (JP)

(72) Inventors: Hideo Nakahara, Torrance, CA (US); Xuqiang Bai, Rancho Palos Verdes, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/140,915

(22) Filed: Apr. 28, 2016

(51) Int. Cl.
*G06K 15/02* (2006.01)
*G06F 3/12* (2006.01)

(52) U.S. Cl.
CPC ....... *G06K 15/1836* (2013.01); *G06F 3/1208* (2013.01); *G06F 3/1215* (2013.01); *G06F 3/1247* (2013.01); *G06F 3/1248* (2013.01); *G06K 15/1802* (2013.01); *G06K 15/1813* (2013.01); *G06K 15/1817* (2013.01); *G06K 15/1822* (2013.01); *G06K 15/1863* (2013.01); *G06K 15/1894* (2013.01)

(58) Field of Classification Search
None
See application file for complete search history.

(56) References Cited

U.S. PATENT DOCUMENTS 8,194,271 B2  6/2012 Nakahara
8,520,243 B2  8/2013 Nakahara
2006/0028701 A1  2/2006 Suzuki
2009/0103139 A1  4/2009 Ozawa
2013/0188200 A1  7/2013 Nakahara
2013/0286422 A1  10/2013 Hirano
2016/0350949 A1*  12/2016 Bai ........................... G06T 1/20

FOREIGN PATENT DOCUMENTS

JP    2007026285 A    2/2007

OTHER PUBLICATIONS

Bai et al., U.S. Appl. No. 14/923,924, Method and System for Rendering Rectangle Drawing Objects Using One-Line Raster Image Data, specification and figures as filed Oct. 27, 2015.

* cited by examiner

*Primary Examiner* — Scott A Rogers
(74) *Attorney, Agent, or Firm* — McDonnell Boehnen Hulbert & Berghoff LLP

(57) ABSTRACT

A method and system for rendering rectangle drawing objects using a clip region are provided. For at least a first rectangle drawing object and a second rectangle drawing object, a determination is made if the first rectangle drawing object and the second rectangle drawing object satisfy a predetermined condition. If the predetermined condition is satisfied, one-line raster image data associated with the first and second rectangle drawing objects is generated, and a clip region corresponding to the first and second rectangle drawing objects is generated. Subsequently, the one-line raster image data may be used together with the clip region to fill a clipped drawing region corresponding to the first and second rectangle drawing objects.

20 Claims, 23 Drawing Sheets

MERGE CURRENT RECTANGLE
AND INCOMING RECTANGLE
COORDINATES

METHOD AND SYSTEM FOR RENDERING RECTANGLE DRAWING OBJECTS USING A CLIP REGION

INCORPORATION BY REFERENCE

This application is related to and hereby incorporates by reference the entirety of co-pending U.S. patent application Ser. No. 14/923,924 (hereinafter, "the '924 Application"), filed on Oct. 27, 2015, the entirety of which is hereby incorporated by reference

BACKGROUND

Print data may contain data representing various drawing objects having different shapes that are used to form a final output image. One example of such drawing object is a drawing object having a shape of a rectangle. As used herein, a drawing object having a shape of a rectangle will be termed as a "rectangle drawing object." In this regard, based on the print data, multiple rectangle drawing objects (e.g., a sequence of rectangle drawing objects) may need to be rendered. One example of rendering of multiple rectangle drawing objects is the case of forming a non-uniform background of the final output image.

Typically, each rectangle drawing object in the print data will have a corresponding filling color that fills a rectangle drawing object (or, in other words, a "rectangle filling color"). One traditional method of rendering a rectangle drawing object is to generate rectangle orders (or printing commands), and to set a rectangle filling color for every single rectangle. FIG. 1 depicts an example of a related art workflow for drawing a rectangle object.

As shown in FIG. 1, at step 10, rendering of rectangle drawing object starts. At step 12, a rectangle filling color is set. Then, at step 14, rectangle parameters are set (e.g., a width and a height of the rectangle are set). At step 16, rectangle orders are generated and, at step 18, the rendering of rectangle drawing object ends.

As noted above, the above-described process is traditionally carried out for each single rectangle drawing object in a plurality of rectangle drawing objects to be rendered. For example, when two rectangle drawing objects are not connected or overlap each other, traditionally, such drawing objects need to be rendered individually. Hence, when many such drawing objects exist, the rectangle order generation and filling color setup will take time and cause printing speed performance to slow down.

SUMMARY

In light of the above, the present disclosure provides a way to improve drawing time for rectangle drawing objects that meet one of predetermined conditions.

More specifically, in one aspect, a disclosed method for rendering rectangle drawing objects comprises: (i) receiving, by at least one processor, print data including data representing a plurality of rectangle drawing objects, the plurality of rectangle drawing objects including at least a first rectangle drawing object and a second rectangle drawing object, (ii) determining, by the at least one processor, if the first rectangle drawing object and the second rectangle drawing object satisfy a predetermined condition, (iii) if the predetermined condition is satisfied, (a) generating, by the at least one processor, one-line raster image data associated with the first and second rectangle drawing objects, and storing, by the at least one processor, the one-line raster image data in a data buffer, wherein the one-line raster image data indicates a first filling color of the first rectangle drawing object over a first extent along a first direction and a second filling color of the second rectangle drawing object over a second extent in the first direction, and (b) generating, by at the at least one processor, a clip region corresponding to the first and second rectangle drawing objects, and (iii) using, by the at least one processor, the one-line raster image data together with the clip region to fill a clipped drawing region corresponding to the first and second rectangle drawing objects, the clipped drawing region being filled along a second direction that is perpendicular to the first direction.

These as well as other aspects, advantages, and alternatives will become apparent to those of ordinary skill in the art by reading the following detailed description with reference where appropriate to the accompanying drawings.

BRIEF DESCRIPTION OF THE DRAWINGS

Further.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Apparatus

Figure 1:
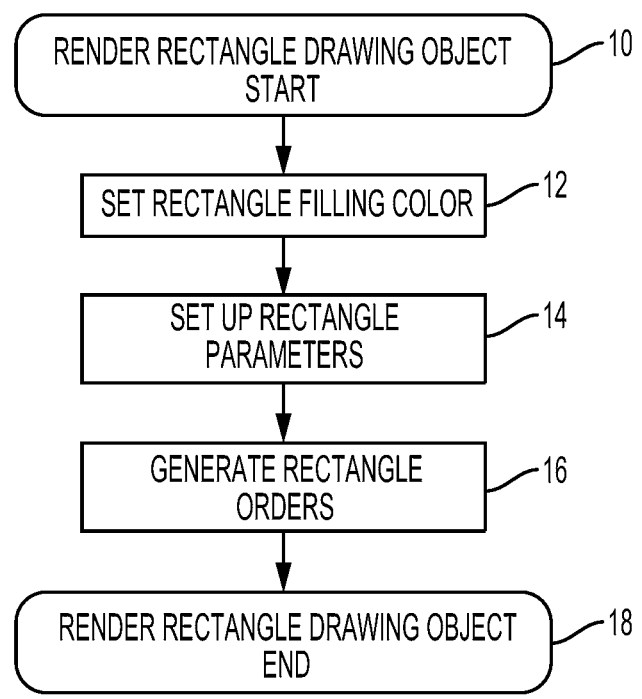
FIG. 1 is a flow chart depicting an example of a related art method of rendering a rectangle drawing object.
Figure 2:
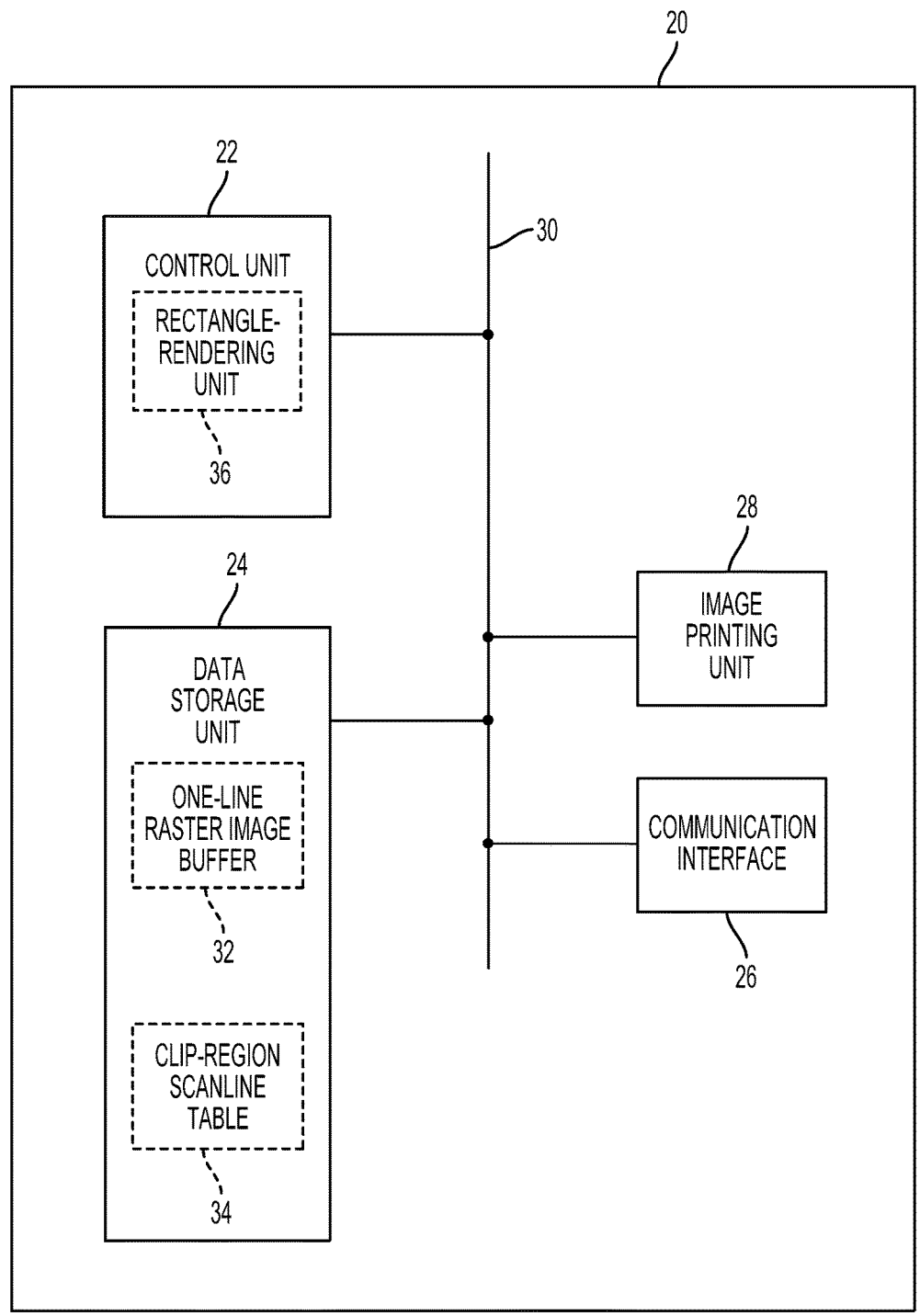
FIG. 2 illustrates an example of a basic configuration of an image forming apparatus in which an example embodiment of the present disclosure may be employed.

FIG. 2 illustrates an example of a basic configuration of an image forming apparatus 20 in which an example embodiment of the present disclosure may be employed.

As illustrated, the image forming apparatus 20 may include a control unit 22, a data storage unit 24, and a communication interface 26, and an image printing unit 28, all connected together via a system bus or other mechanism 30. Further, as shown in FIG. 2, the data storage unit 24 includes a one-line raster image buffer 32 and a clip-region scanline table 34. The control unit 22 includes a rectangle-rendering unit 36.

However, it should be understood that this system arrangement is shown for purpose of example only, and the image forming apparatus 20 may also include other components not shown in FIG. 2. As an example, the control unit 12 may further include a number of other units including, for instance, a data reception unit configured to receive incoming print data from the communication interface 16. In this regard, the incoming print data received by the communication interface 16 may be in the form of any suitable page description language (PDL), and the control unit 12 may further include a PDL interpretation unit configured to interpret the PDL print data and pass different types of objects included in the PDL print data for further processing, such as by the rectangle drawing unit 36.

In general, the control unit 22 may comprise one or more central processing units (CPUs), general purpose processors, and/or dedicated processors (e.g., application specific integrated circuits (ASICs) or digital signal processors (DSPs)). The data storage unit 24 may be a non-transitory computer-readable medium, and can be a volatile and/or nonvolatile type of data storage.

Aside from the one-line raster image buffer 32 and the clip-region scanline table 34, the data storage unit 24 may include storage area(s) for holding incoming print data received by the communication interface 26 from an external device, such as a host computer, as well as image data to be printed out by the image printing unit 28. The data storage unit 24 may also store various program logic including program instructions (e.g., machine language instructions or any other higher-level programming instructions) executable by the control unit 22 to carry out various functions of the image forming apparatus 20. The data storage unit can also store other data used by such program logic.

The rectangle-rendering unit 36 may be a logical module implemented in software executed by the control unit 22 or may be a dedicated processing unit (e.g., an ASIC) programmed to execute various functions described herein. For instance, the rectangle-rendering unit 36 may be configured to process and render incoming rectangle drawing objects. In this regard, the rectangle-rendering unit 36 may be further configured to generate scanlines associated with a respective rectangle drawing object for storage in the clip-region scanline table 34. The clip-region scanline table 34 may include scanline data defining a clip region corresponding to one or more rectangle drawing objects. Further, the one-line raster image buffer 32 may be a data buffer that functions as a temporary data storage in which one-line raster image data is held as will be described later.

The incoming print data received by the communication interface 26 may be in the form of any suitable page description language (PDL). As known in the art, the PDL is a language that describes an appearance/layout of a printed page using a higher level commands than an actual output raster (or bitmap) image. The PDL data may define various drawing objects, including rectangle drawing objects, as vector graphics expressed by vector coordinates, such as in the form of (X, Y) coordinates. In turn, the control unit 22 may include a raster image processor (RIP) that can transform/convert vector digital information into a raster (or pixel) format, such as in accordance with command(s) in the PDL data.

As noted above, the present disclosure provides a way to improve drawing time for rectangle drawing objects that meet a predetermined condition.

Namely, in accordance with some embodiments, one predetermined condition may hold that (i) a first rectangle drawing object and a second rectangle drawing object are parallel with respect to a first direction (e.g., a horizontal x-axis direction), (ii) along a second direction that is perpendicular (or orthogonal) to the first direction, a length of the first rectangle drawing object is equal to or smaller than a length of the second rectangle drawing object, and (iii) the first rectangle drawing object and the second rectangle drawing object are connected or overlap each other in the first direction.

Another predetermined condition may hold that (i) a first rectangle drawing object and a second rectangle drawing object are parallel with respect to a first direction (e.g., a horizontal x-axis direction), (ii) along a second direction that is perpendicular (or orthogonal) to the first direction, an overlap exists between an extent of the first rectangle drawing object and an extent of the second rectangle drawing object, and (iii) the first rectangle drawing object and the second rectangle drawing object are not connected and do not overlap each other in the first direction.

Since a rectangle drawing object is a two-dimensional object having two sides, as generally used herein, plural rectangle drawing objects may be considered parallel with respect to a given direction (e.g., a horizontal x-axis direction) when same one of two sides of each of the rectangle drawing objects is parallel with respect to the given direction (e.g., same respective side of each of the rectangle drawing objects is parallel with an x-axis).

Further, note that, as used herein, the term "render" (and grammatical variants thereof, such as "rendering," "rendered," etc.) generally refers a process of converting an input object described by PDL data into a data format which an image forming apparatus can use to form an output image. Such process could include multiple stages, where a stage of converting the input object into an intermediate data format may also be referred as "rendering."

2. Example Operation

Figure 3:
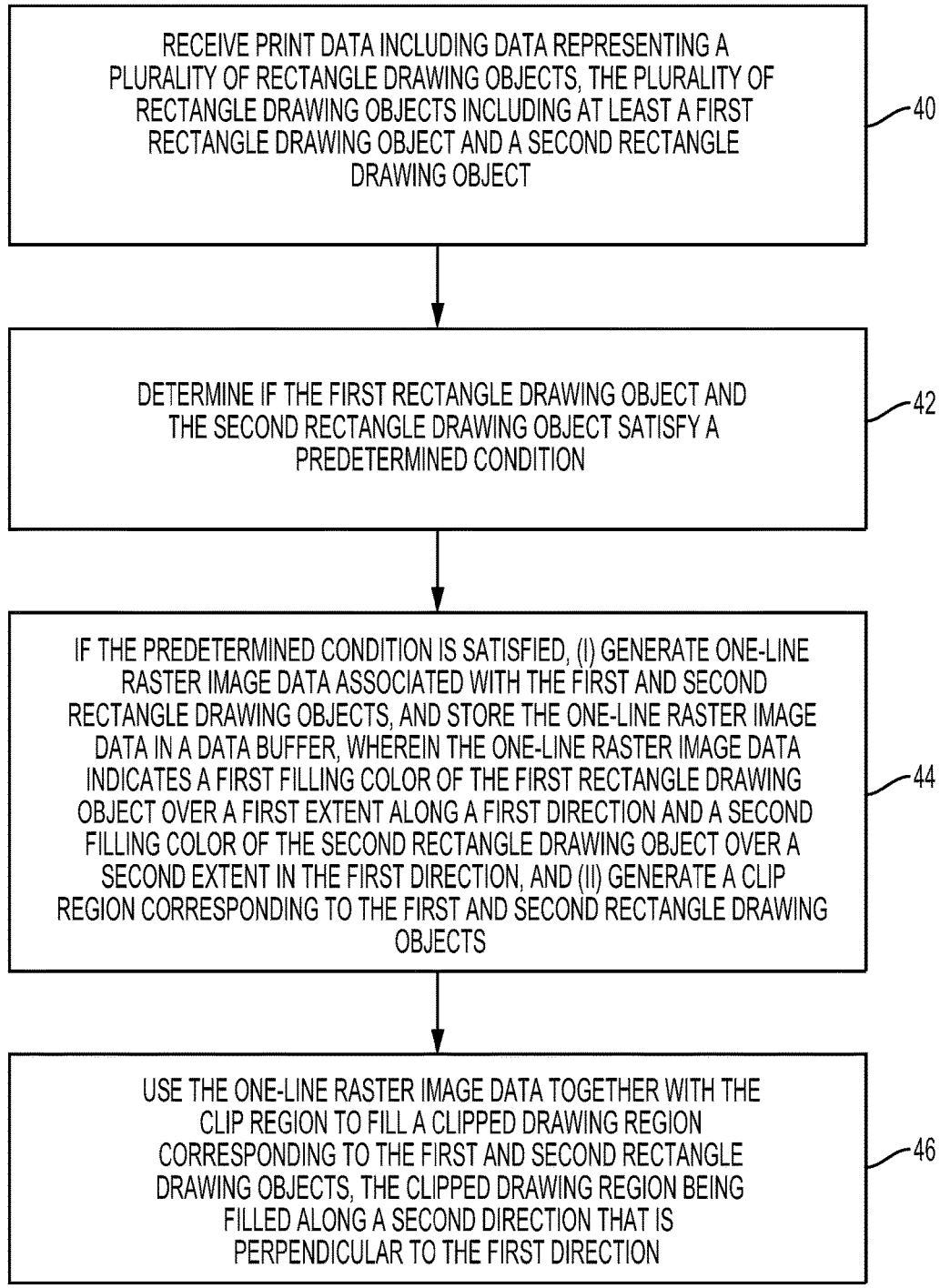
FIG. 3 is a flow chart summarizing an example set of functions that could be carried out in the image forming apparatus of FIG. 1, in accordance with an example embodiment.

FIG. 3 is a flow chart summarizing an example set of functions that could be carried out in accordance with the above-summarized process in the arrangement of FIG. 2, for instance, such as by the rectangle-rendering unit 36 of the control unit 22.

Step 40 involves receiving print data including data representing a plurality of rectangle drawing objects, the plurality of rectangle drawing objects including at least a first rectangle drawing object and a second rectangle drawing object. Step 42 involves determining if the first rectangle drawing object and the second rectangle drawing object satisfy a predetermined condition. If the predetermined condition is satisfied, step 44 involves (i) generating one-line raster image data associated with the first and second rectangle drawing objects, and storing the one-line raster image data in a data buffer, wherein the one-line raster image data indicates a first filling color of the first rectangle drawing object over a first extent along a first direction and a second filling color of the second rectangle drawing object over a second extent in the first direction, and (ii) generating a clip region corresponding to the first and second rectangle drawing objects. Finally, step 46 involves using the one-line raster image data together with the clip region to fill a clipped drawing region corresponding to the first and second rectangle drawing objects, the clipped drawing region being filled along a second direction that is perpendicular to the first direction.

In general, steps 42-46 may be executed with respect to two or more rectangle drawing objects in the received print data, where each incoming rectangle drawing object and a current rectangle drawing object may be checked to determine if they satisfy the predetermined condition. As will be explained later, the current rectangle drawing object may be a rectangle drawing object corresponding to one or more rectangle drawing objects previously processed. If the predetermined condition is satisfied, one-line raster image data associated with the incoming rectangle drawing object may be generated and added to, or merged/combined with, one-line raster image data associated with the current rectangle drawing object and already stored in the data buffer (e.g., the one-line raster image buffer 32). Further, a clip region corresponding to the current and incoming rectangle drawing objects may be generated. In this regard, as will be described later, a first clip region corresponding to the current rectangle drawing object may be updated to include a second clip region corresponding to the incoming rectangle drawing object. Then, the merged one-line raster image data may be used together with the clip region to fill a clipped drawing region corresponding to the current and incoming drawing objects.

For example, assuming each rectangle has a single color, if the predetermined condition is met, the one-line raster image buffer 32 can be used to represent the color(s) of the two rectangles. If both rectangles have the same color C, then the one-line raster image buffer 32 can include one or more pixels each having the color C. If the first rectangle drawing object is colored with color C1, and the second rectangle drawing object is colored with color C2, where C1≠C2, then the one-line raster image buffer 32 can have pixels of both C1 and C2 colors that meet the predetermined condition. The one-line raster image buffer 32 can have pixels of C1 color representing portions of the first rectangle drawing object that do not overlap with the second rectangle object and pixels of C2 color representing portions of the second rectangle drawing object that do not overlap with the first rectangle object.

The first and second rectangle objects can overlap and still satisfy the predetermined condition. Then, the one-line raster image buffer 32 can have pixels of C1 or C2 color for an overlapping region, where the color that are determined based on which rectangle drawing object is to be drawn on top of the other rectangle drawing object; i.e., if the first rectangle drawing object is to be drawn before the second rectangle drawing object, then the second rectangle drawing object would be drawn on top (or vice versa).

To render the first and second rectangle drawing objects, pixels can be selected from the one-line raster image buffer 32 in accordance with the above-mentioned clip region. Suppose the one-line raster image buffer 32 has a horizontal (or vertical) orientation and the clip region includes a number of corresponding horizontal (or vertical) lines 1, 2, 3, . . . LMAX. Then, to render a line L, 1≤L≤LMAX, of the first and second rectangle drawing objects, pixels can be selected from the one-line raster image buffer 32 that are also within line L of the clip region.

For example, each pixel within the clip region on line L can be considered logically TRUE, and each pixel outside of the clip region but still within the range of pixels represented by one-line raster image buffer 32 can be considered to be logically FALSE. Then, to draw line L, pixels in the one-line raster image buffer 32 can be logically AND'd with the logically TRUE and FALSE pixels from the clip region for line L. Other techniques for representing the clip region and/or rendering the first and second rectangle drawing objects based on the clip region and the one-line raster image buffer 32 are possible as well.

This representation of a clip region and one-line raster image buffer 32 can save space in comparison to saving all of the pixels of both the first and second rectangle drawing objects. Further, in some embodiments, the use of the clip region and one-line raster image buffer 32 can speed up the rendering process. For example, the clip region and/or one-line raster image buffer 32 can be cached to enable relatively-fast memory access during the rendering process, thus speeding up rendering. Other techniques to speed up rendering using the clip region and/or one-line raster image buffer 32 are possible as well.

In this regard, the merged one-line raster image data may be used to produce one-line printing image data for filling the clipped drawing region. For instance, halftoned data may be generated from the one-line printing image data to fill the clipped drawing region with the halftoned data.

The process can continue until, for instance, the predetermined condition is no longer satisfied with respect to a next incoming rectangle drawing object or if there are no more drawing objects to process. Accordingly, the clipped drawing region may be printed out.

Figure 4:
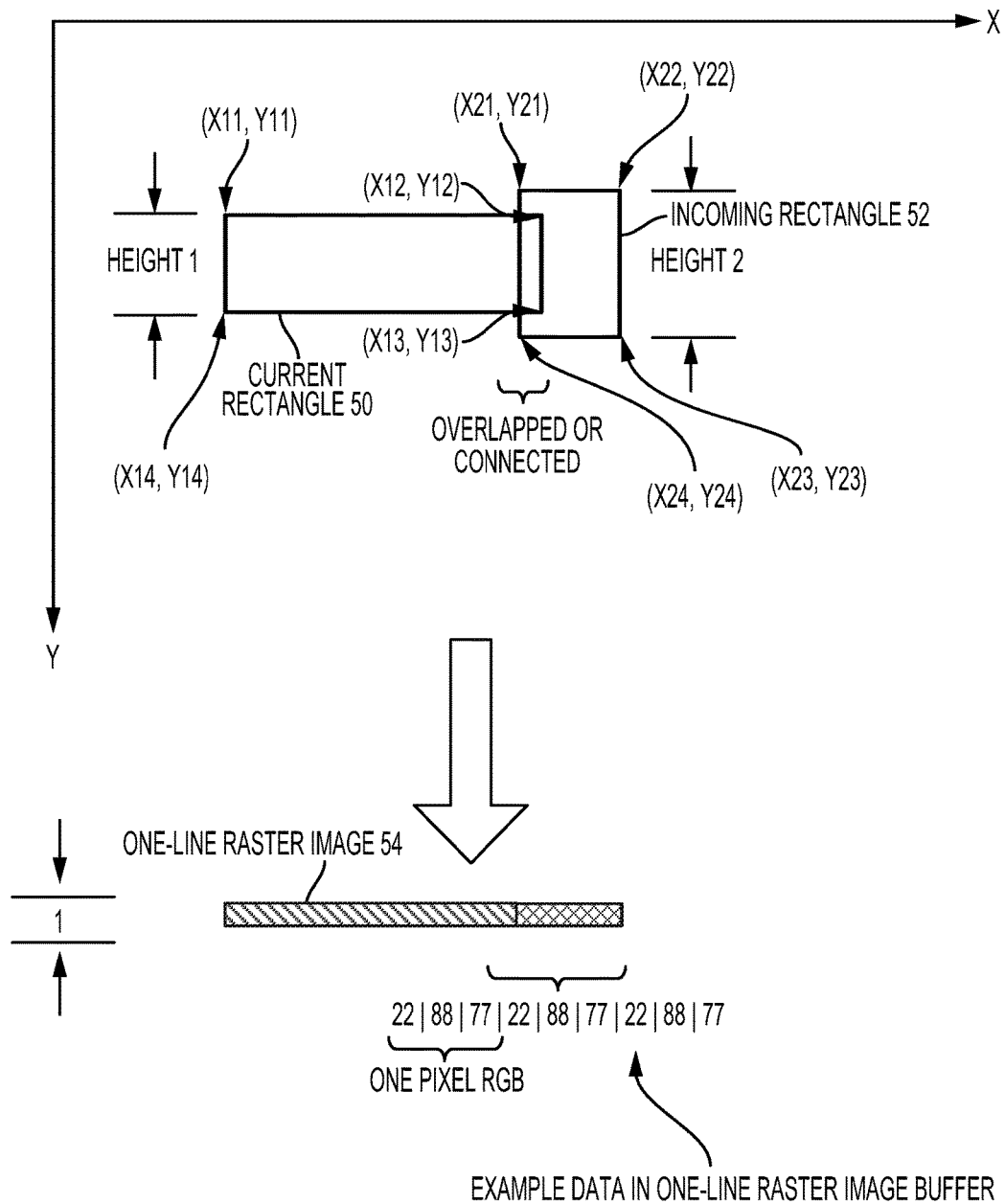
FIG. 4 illustrates one example in which a one-line raster image is generated for two rectangle drawing objects that are positioned along an x-axis defining a horizontal direction and that satisfy a predetermined condition, in accordance with an example embodiment.
Figure 5:
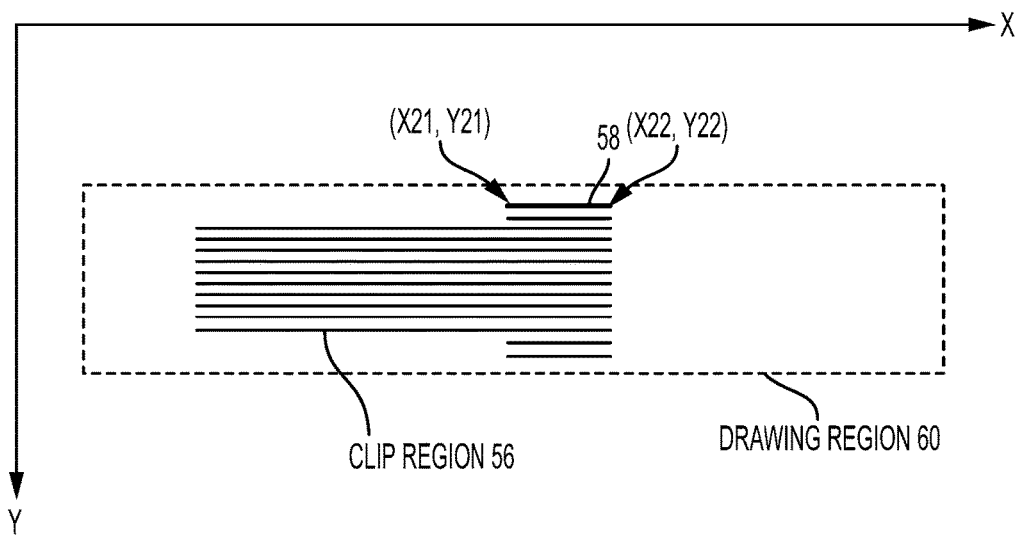
FIG. 5 illustrates a clip region corresponding to the two rectangle drawing objects illustrated in FIG. 4.

FIG. 4 illustrates one example in which a one-line raster image is generated for two rectangle drawing objects that are positioned along an x-axis that defines a horizontal direction and satisfy a predetermined condition, in accordance with an example embodiment. Further, FIG. 5 illustrates a clip region corresponding to the two rectangle drawing objects illustrated in FIG. 4. Note, however, that in other examples, more rectangle drawing objects may exist. A y-axis, perpendicular (orthogonal) to the x-axis, defines a vertical direction, with y values increasing downwards.

In example embodiments, the x-axis and the y-axis may define a coordinate system used by the image forming apparatus 20. In one example, in such coordinate system, a left top corner of a page could be defined as a reference/origin point having X and Y coordinates of (0,0). However, the reference/origin point of a page could be defined in a different way, e.g., depending on a coordinate system adopted by a particular image forming apparatus.

As shown in FIG. 4, a current rectangle drawing object 50 and an incoming rectangle drawing object 52 each have a width parameter and a height parameter. The width of each of the current and incoming rectangle drawing objects 50 and 52 extends in the horizontal direction, and the height of each of the current and incoming rectangle drawing objects 50 and 52 extends in the vertical direction.

FIG. 4 illustrates an example in which the predetermined condition holds that: (i) the current rectangle drawing object 50 and the incoming rectangle drawing object 52 are parallel with the x-axis, (ii) along the vertical direction, a length (or in this case, the height) of the current rectangle drawing object 50 (denoted as "HEIGHT 1") is equal to or smaller than a length (or in this case, the height) of the incoming rectangle drawing object 52 (denoted as "HEIGHT 2"), and (iii) the current rectangle drawing object 50 and the incoming rectangle drawing object 52 are connected or overlap each other in the horizontal direction.

In the example of FIG. 4, with respect to item (ii), in order to meet the predetermined condition, the Y12 coordinate, for instance, would be greater than or equal to the Y21 coordinate, whereas the Y13 coordinate, for instance, would be less than or equal to the Y24 coordinate. As such, the predetermined condition requires that a y-axis range (or, in this case, vertical) of the current rectangle drawing object 50 falls within a y-axis range (or, in this case, vertical) of the incoming rectangle drawing object 52. In other words, the y-axis range of the current rectangle drawing object 50 is less than or equal to the y-axis range of the incoming rectangle drawing object 52.

Accordingly, since the current and the incoming rectangle drawing objects 50 and 52 satisfy the predetermined condition, one-line raster image data associated with the current rectangle drawing object 50 and the incoming rectangle drawing object 52 is generated and stored in the one-line raster image buffer 32. In this regard, the one-line raster image data indicates a filling color of the incoming rectangle drawing object 52 over the width of the incoming rectangle drawing object 52. In the raster format, the width of the incoming rectangle drawing object 52 may be defined by a given number of pixels (e.g., m pixels, where m represents a number). The one-line raster image data will then include color data for each of those pixels for a single raster image line that is one-pixel wide.

To illustrate, FIG. 4 shows one example of data held in the one-line raster image buffer 32 for the incoming rectangle drawing object 52 when a filling color of the incoming rectangle drawing object 52 is defined by RGB data (22, 88, 77) and there are three pixels over an extent from X21 coordinate to X22 coordinate, where that extent corresponds to the width of the incoming rectangle drawing object 52. Note, however, that a rectangle filling color may be generally defined in any other suitable color space other than the RGB color space.

As shown in FIG. 4, the one-line raster image data associated with the incoming rectangle drawing object 52 may be merged with one-line raster image data associated with the current rectangle drawing object 50 and previously stored in the one-line raster image buffer 32 to generate a merged one-line raster image data associated with the current and incoming rectangle drawing objects 50 and 52. If the current and incoming rectangle drawing objects 50 and 52 are connected, the one-line raster image data associated with the current rectangle drawing object 50 may indicate a filling color of the current rectangle drawing object 50 over the width of the current rectangle drawing object 50. If, on the other hand, the current and incoming rectangle drawing objects 50 and 52 overlap each other, in an area of overlap, a color of overlapping pixels may correspond to a rectangle filling color of a rectangle drawing object processed last. Accordingly, in the example of FIG. 4, in the area of overlap, the merged one-line raster image data may include color data corresponding to the filling color of the incoming rectangle drawing object 52.

As generally used herein, a raster image corresponding to one-line raster image data (or, a raster image generated from the one-line raster image data), will be referred to as "one-line raster image." To illustrate, FIG. 4 depicts an example of a one-line raster image 54 corresponding to the merged one-line raster image data associated with the current and incoming rectangle drawing objects 50 and 52.

It should be understood, however, that in other examples, the merged one-line raster image data could include one-line raster image data for more than two rectangle drawing objects as more incoming rectangle drawing objects satisfying the predetermined condition are processed. For example, once the incoming rectangle drawing object 52 is processed, this incoming rectangle drawing object will become a "current" rectangle drawing object (possibly together with the current rectangle drawing object 50 if coordinates of the current rectangle drawing object 50 and the incoming rectangle drawing object 52 are merged, as will be described later) with respect to which a next incoming rectangle drawing object may be checked for the predetermined condition. If the predetermined condition is satisfied, one-line raster image data associated with the next incoming rectangle drawing object will be subsequently merged with one-line raster image data already held in the one-line raster image buffer 32 for other previously processed rectangle drawing objects in a group of rectangle drawing objects (e.g., the rectangle drawing objects 50 and 52).

Figure 6A:
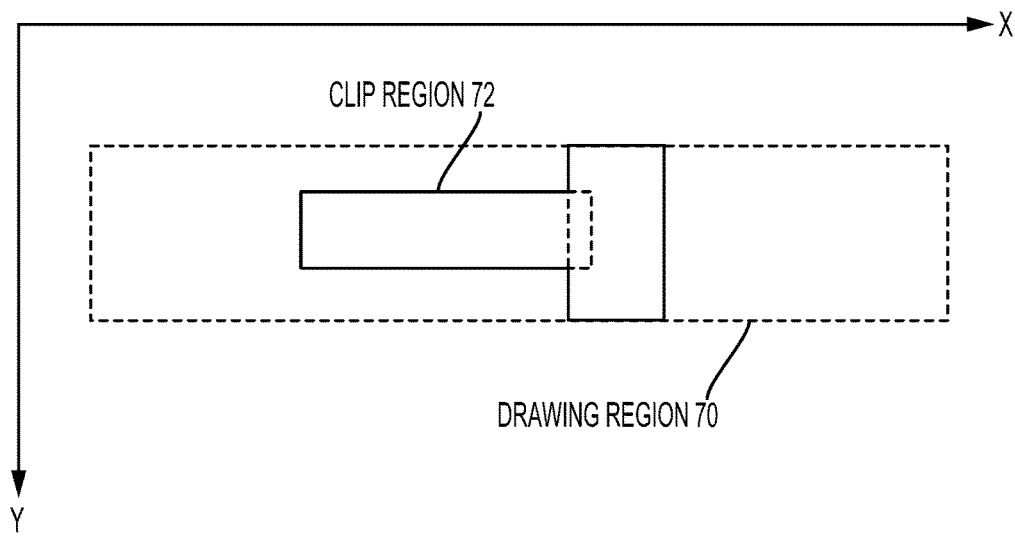
FIG. 6A illustrates an example of how a drawing region may be restricted by a clip region.
Figure 6B:
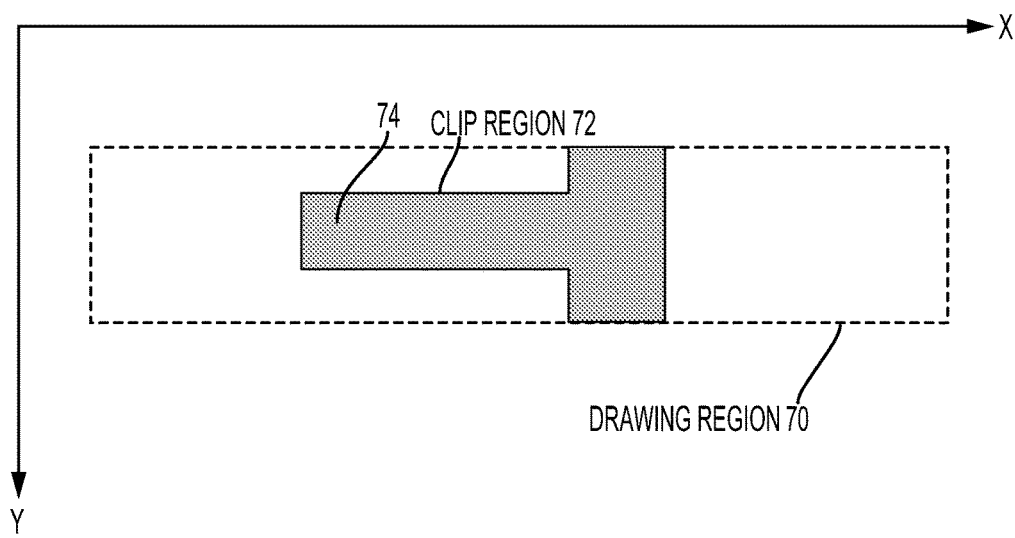
FIG. 6B illustrates the clip region of FIG. 6A filled with a color.

Further, when the current and the incoming rectangle drawing objects 50 and 52 satisfy the predetermined condition, a clip region 56 (see FIG. 5) corresponding to the current and the incoming rectangle drawing objects 50 and 52 is generated. As a general matter, a clip region may be used to restrict drawing to a certain area. FIG. 6A depicts an example of how a drawing region may be restricted by a clip region. In particular, FIG. 6A shows a drawing region 70 and a clip region 72 that may be used to restrict the drawing region 70 only to an area covered by the clip region 72. When a drawing and color filling operation is performed on the drawing region 72, in effect, only the area covered by the clip region would be drawn and filled with a color 74, as shown in FIG. 6B.

The clip region 56 shown in FIG. 5 may be defined using scanlines. As used herein, the term "scanline" is used herein to generally refer to a single line or row making up a rectangle drawing object. Namely, each of the rectangle drawing objects 50 and 52 may be rendered to respective scanlines and the respective scanlines for each of the rectangle drawing objects may be added to one scanline table, such as the clip-region scanline table 34. As will be described hereinafter, in some instances, a clip region corresponding to a current rectangle drawing object may be updated to include a clip region corresponding to an incoming second rectangle drawing object to generate an updated clip region corresponding to the current and incoming rectangle drawing objects. In this regard, the clip region updating process may include merging scanlines associated with one rectangle drawing object with scanlines associated with another rectangle drawing object, such as by updating parameters a scanline associated with one drawing object to include a scanline associated with another drawing object.

In some embodiments, the given scanline may be defined by a pair of coordinates, such as start and end coordinates (e.g., (X0, Y0) and (X1, Y1)), that define an extent of the given scanline along a given axis (e.g., the x-axis, with the start x-coordinate being smaller than the end x-coordinate). For example, as shown in FIG. 5, the clip region 56 corresponding to the two rectangle drawing objects illustrated in FIG. 4 may be defined using a first plurality of scanlines associated with the current rectangle drawing object 50 and a second plurality of scanlines associated with the incoming rectangle drawing object 52. In this regard, each scanline may be defined by respective start and end coordinates. For instance, as shown FIG. 5 by way of example, one of the scanlines associated with the current rectangle drawing object 50, i.e., a scanline 58, is defined by coordinates (X21, Y21) and (X22, Y22), where Y21=Y22, indicating a position of the scanline along the y-axis and an extent of the scanline along the x-axis (i.e., the scanline extends from X0 coordinate to X1 coordinate in an x-axis direction). In particular, in this case, the extent of the scanline 60 along the x-axis corresponds to a width extent of the incoming rectangle drawing object 52.

Further, FIG. 5 depicts a drawing region 60 that may be "clipped" by the clip region 56 to generate a clipped drawing region corresponding to the current and incoming rectangle drawing objects 50 and 52. As used herein, the term "a clipped region" refers to a drawing region that covers an area defined by the clip region. As will be described later, the clipped drawing region may be filled with one-line raster image data by referring to the clip-region scanline table 34 holding scanline data defining the clip region.

Figure 7:
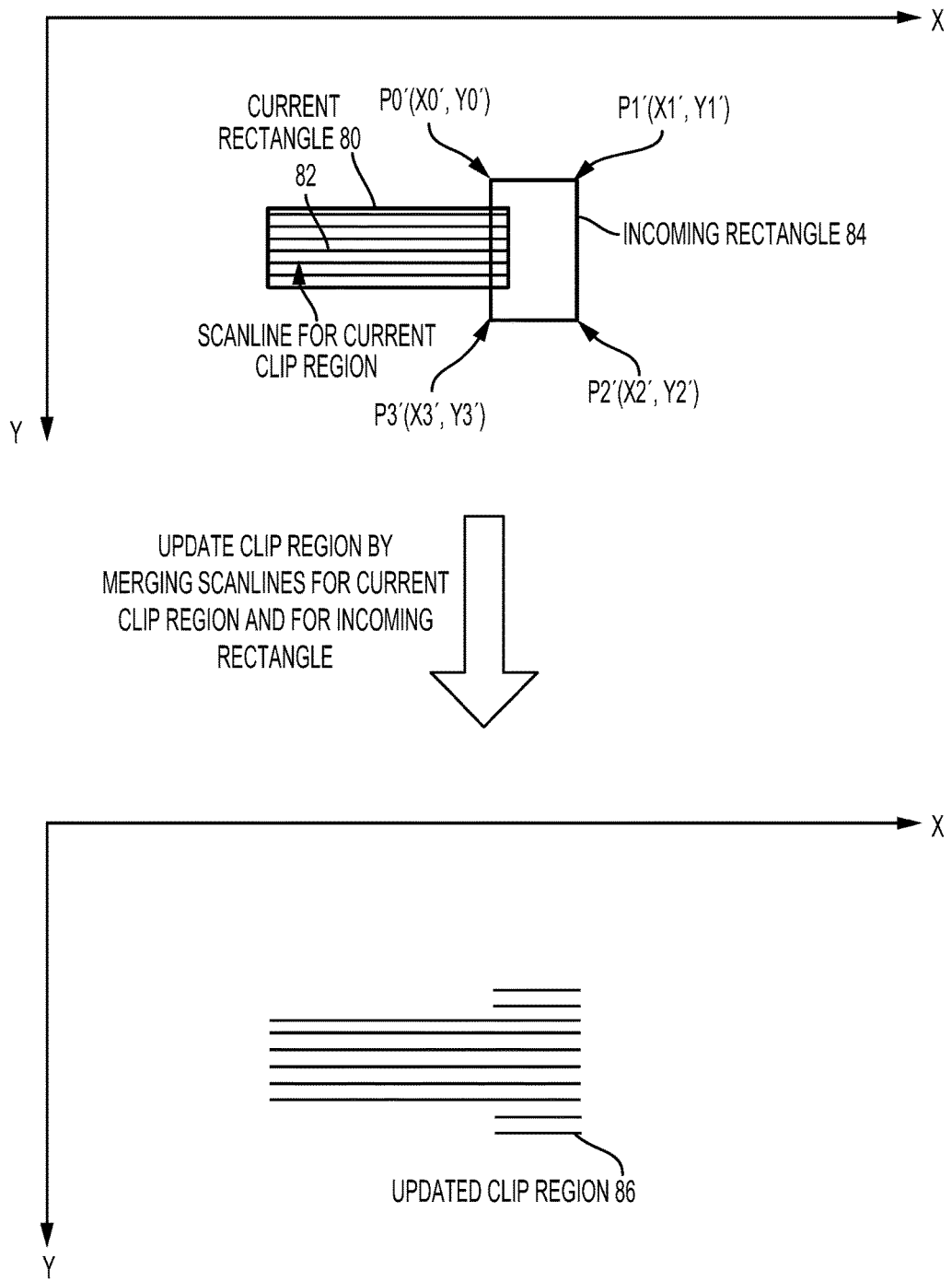
FIG. 7 illustrates an example of updating a clip region in a horizontal case in which rectangle drawing objects are positioned along a horizontal direction and overlap each other.

As noted above, a first clip region corresponding to a current rectangle drawing object may be updated to include a second clip region corresponding to an incoming rectangle drawing object. FIG. 7 illustrates an example of updating a clip region in a horizontal case in which rectangle drawing objects are positioned along a horizontal direction and overlap each other.

As shown in FIG. 7, a current rectangle drawing object 80 is first rendered to scanlines defining a current clip region 82. Then, an incoming rectangle drawing object 84 that overlaps the current rectangle drawing object is processed by rendering the incoming rectangle drawing object 84 to scanlines, and merging scanlines defining the current clip region 82 with scanlines for the incoming rectangle drawing object 84 to generate an updated clip region 86 corresponding to both the current rectangle drawing object and the incoming rectangle drawing objects 80 and 84.

In this regard, when the scanlines associated with the incoming rectangle drawing object 84 are combined with the scanlines associated with the current rectangle drawing object 82 in a scanline table, such as the clip-region scanline table 34, those scanlines that fall within an area of overlap between the two rectangle drawing objects 80 and 82 may be merged together. The merging process may include updating parameters of a scanline associated with the current rectangle drawing object 80 to include a scanline associated with the incoming rectangle drawing object 84 that overlaps the scanline associated with the current rectangle drawing object 80.

Figure 8:
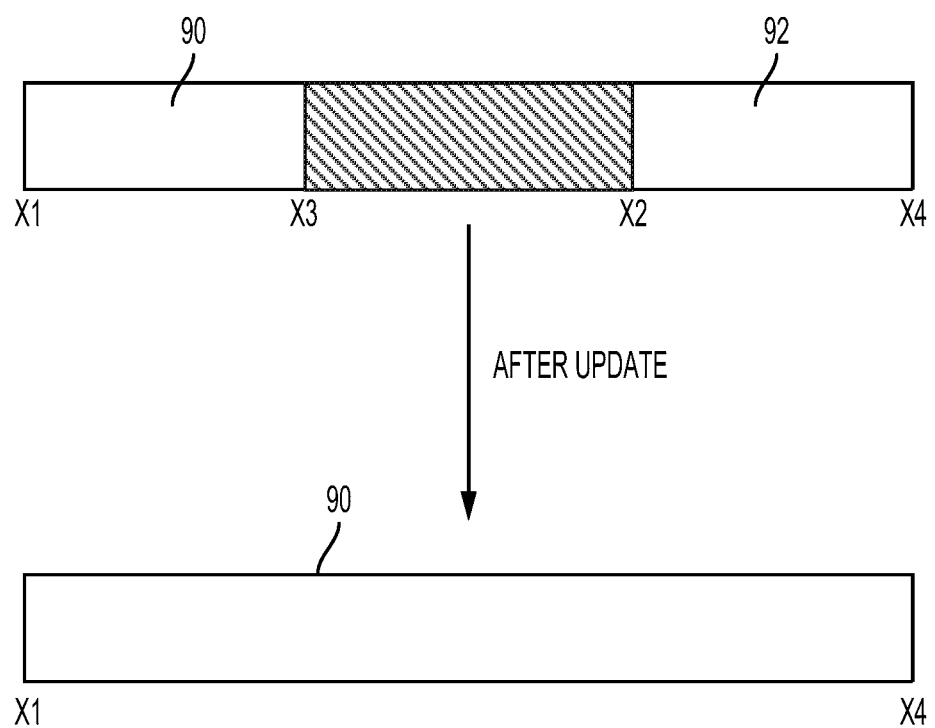
FIG. 8 depicts an example of two scanlines in which one scanline is merged with another scanline.

To illustrate, FIG. 8 depicts an example of two scanlines in which one scanline is merged with another scanline. This example assumes that scanlines 90 and 92 have the same y-coordinate and extend along an x-axis. As shown in FIG. 8, X1 and X2 are start and end coordinates of the scanline 90, respectively, while X3 and X4 are start and end coordinates of the scanline 92. Further, as shown in FIG. 8, the scanline 92 overlaps the scanline 90 over a partial extent of the scanline 90. Accordingly, the scanline 90 can be merged together with the scanline 92 by updating scanline parameters of the scanline 90 to include the scanline 92. Namely, parameters of the scanline 90, i.e., the start and end x-coordinates of the scanline 90, are merged with parameters of the scanline 92 such that the start and end x-coordinates of the scanline 90 become X1 and X4.

Although not illustrated pictorially, similar clip region update process, as described above, may be carried in a case where two rectangle drawing objects are connected. Namely, a current rectangle drawing object may be first rendered to scanlines defining a current clip region. Then, an incoming rectangle drawing object that is connected with the current rectangle drawing object is processed by rendering the incoming rectangle drawing object to scanlines, and merging the scanlines defining the current clip region with scanlines for the incoming rectangle drawing object to generate an updated clip region corresponding to both the current rectangle drawing object and the incoming rectangle drawing object.

In this regard, when the scanlines associated with the incoming rectangle drawing object are combined with the scanlines associated with the current rectangle drawing object in a scanline table, such as the clip-region scanline table 34, those scanlines that fall within an area of connection between the two rectangle drawing objects may be merged together. The merging process may include updating parameters of a scanline associated with the current rectangle drawing object to include a scanline associated with the incoming rectangle drawing object that is connected with the scanline associated with the current rectangle drawing object.

Namely, when two connected scanlines are merged together, parameters of a first scanline connected to a second scanline may be similarly merged with the parameters of the second scanline as in the case illustrated in FIG. 8. For instance, if X1 and X2 are start and end x-coordinates of the first scanline, respectively, while X3 and X4 are start and end x-coordinates of the second scanline, respectively, after the merge, the start and end x-coordinates of the first scanline become X1 and X4.

Referring back to FIG. 4, after the one-line raster image data associated with the current and incoming rectangle drawing objects 50 and 52 and the clip region 56 (see FIG. 5) for those two rectangle drawing objects are generated, the one-line raster image data may be used together with the clip region to fill a clipped drawing region corresponding to the rectangle drawing objects 50 and 52. Namely, the clipped drawing region may be filled with the one-line raster image data by referring to the clip-region scanline table 34 holding scanline data defining the clip region 56. In this regard, the clipped drawing region may be filled on a line-by-line basis by sequentially reading start and end coordinates of every scanline of the clip region 56 and filling the clipped drawing region with either a portion or the entirety of the one-line raster image data depending on the start and end coordinates of a scanline being processed.

To illustrate, with reference to FIGS. 4 and 5, coordinates of the scanline would be read first. Since the scanline 58 extends between the X21 and X22 coordinates, only that portion of the one-line raster image data corresponding to pixels over an extent from the X21 coordinate to the X22 coordinate (where that extent corresponds to the width of the incoming rectangle drawing object 52) would be used to fill the clipped drawing region. The remaining portion of the one-line raster image data falling outside that range would be discarded. Filling operation for subsequent scanlines corresponding only to the incoming rectangle drawing object 52 would be carried out same way. Then, in an area where the two rectangle drawing objects overlap or are connected, the entirety of the one-line raster image data would be used for filling operation. Namely, since the scanline 58 extends between the X21 and X22 coordinates, the entirety of the one-line raster image data corresponding to pixels over the extent from the X21 coordinate to the X22 coordinate would be used to fill the clipped drawing region.

Filling operation for subsequent scanlines corresponding to both of the rectangle drawing objects 50 and 52 would be carried out same way. Then, remaining scanlines associated only with the incoming rectangle drawing object 52 would be processed as described above, by keeping only that portion of the one-line raster image data corresponding to pixels over the extent from the X21 coordinate to the X22 coordinate while discarding the remaining portion of the one-line raster image data falling outside that range.

Figure 9:
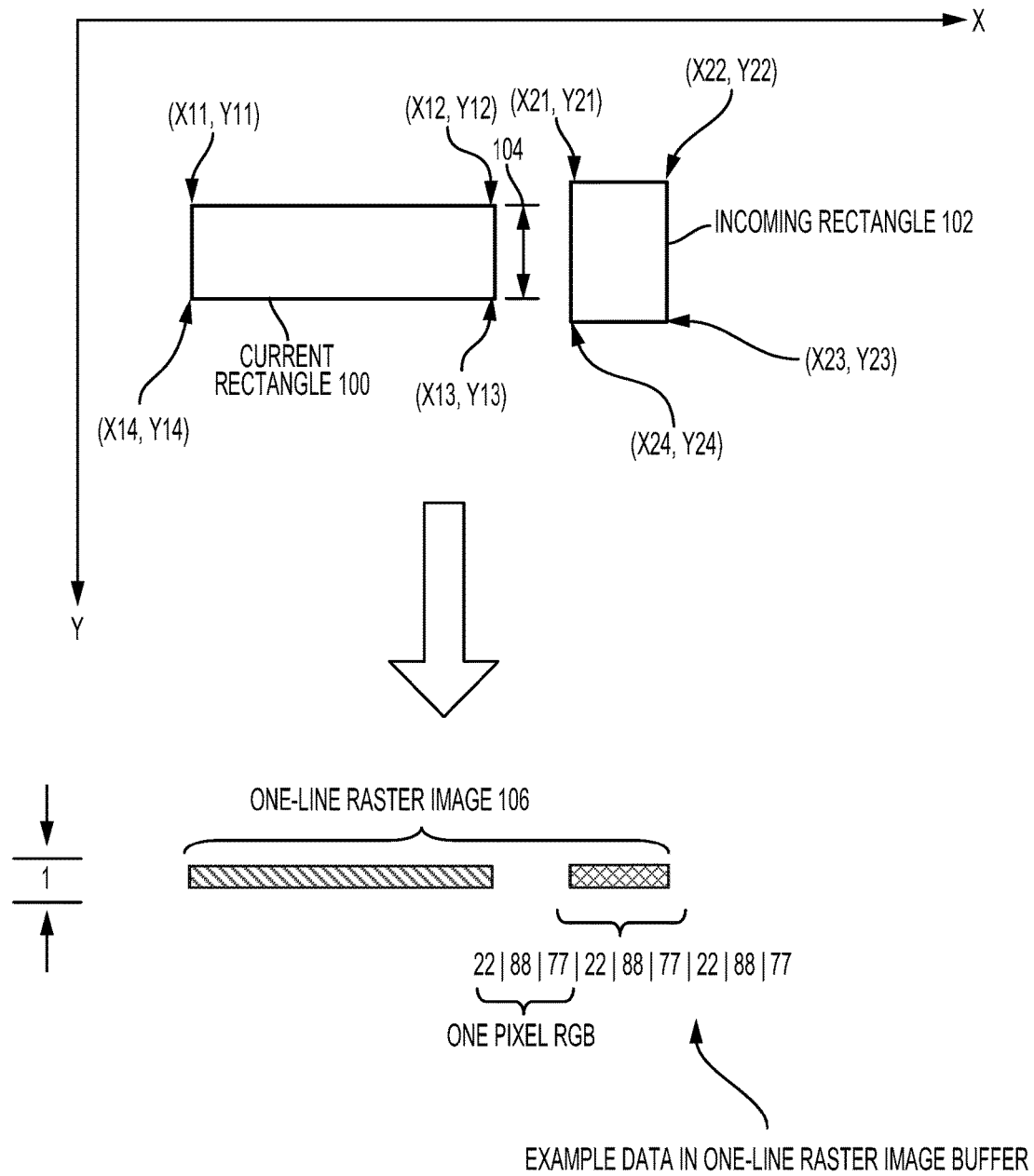
FIG. 9 illustrates another example in which a one-line raster image is generated for two rectangle drawing objects that are positioned along the x-axis that defines the horizontal direction and that satisfy a predetermined condition, in accordance with an example embodiment.
Figure 10:
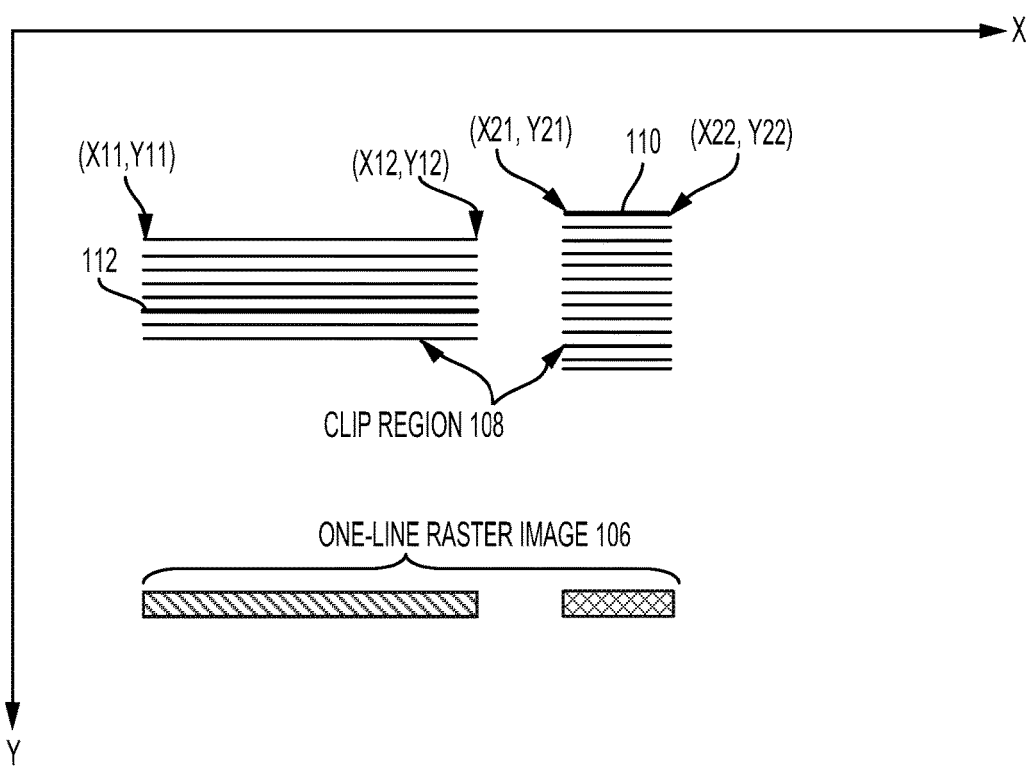
FIG. 10 illustrates a clip region corresponding to the two rectangle drawing objects illustrated in FIG. 9.

FIG. 9 illustrates another example in which a one-line raster image is generated for two rectangle drawing objects that are positioned along the x-axis that defines the horizontal direction and that satisfy a predetermined condition, in accordance with an example embodiment. Further, FIG. 10 illustrates a clip region corresponding to the two rectangle drawing objects illustrated in FIG. 9. Note, however, that in other examples, more rectangle drawing objects may exist. As noted above, the y-axis, perpendicular (orthogonal) to the x-axis, defines the vertical direction.

As shown in FIG. 9, a current rectangle drawing object 100 and an incoming rectangle drawing object 102 each have a width parameter and a height parameter. Similar to the example of FIG. 4, the width of each of the current and incoming rectangle drawing objects 100 and 102 extends in the horizontal direction, and the height of each of those rectangle drawing objects extends in the vertical direction.

FIG. 9 illustrates an example in which the predetermined condition may hold that: (i) the current rectangle drawing object 100 and the incoming rectangle drawing object 102 are parallel with the x-axis, (ii) along the vertical direction, an overlap exists between an extent of the current rectangle drawing object 100 and an extent of the incoming rectangle drawing object 102, and (iii) the current rectangle drawing object 100 and the incoming rectangle drawing object 102 are not connected and do not overlap each other in the horizontal direction.

With respect to item (ii), FIG. 9 shows an area 104 that represents the overlap between the extent of the current rectangle drawing object 100 and the incoming rectangle drawing object 102 along the vertical direction. In other words, an overlap exists between at least a side portion of the current rectangle drawing object 100 and at least a side portion of the incoming rectangle drawing object 102 along the vertical direction, where those two rectangle drawing objects are not connected and do not overlap each other in the horizontal direction.

Similar to FIG. 4, when the current and the incoming rectangle drawing objects 100 and 102 satisfy the predetermined condition, one-line raster image data associated with the current and the incoming rectangle drawing objects 100 and 102 is generated and stored in the one-line raster image buffer 32. In this regard, since the two rectangle drawing objects are not connected and do not overlap each other along the x-axis, the one-line raster image data indicates a filling color of the current rectangle drawing object 100 over the width of current rectangle drawing object 100 and a filling color of the incoming rectangle drawing object 102 over the width of the incoming rectangle drawing object 102. As explained above, in the raster format, the width of each rectangle drawing object 100 and 102 may be defined by a given number of pixels, and the one-line raster image data will include color data for each of those pixels for a single raster image line that is one-pixel wide.

As further shown in FIG. 9, in an area 104 where no connection and no overlap exists between the two rectangle drawing objects 100 and 102 along the x-axis, the one-line raster image data will contain no pixel color data. Rather, in place of pixel data, the one-line raster image data may contain "dummy" data to indicate an area of separation (e.g., over an extent of a given number of pixel units) between the two rectangle drawing objects 100 and 102. To illustrate, FIG. 9 shows one example of data held in the one-line raster image buffer 32 for the incoming rectangle drawing object 102 when a filling color of the incoming rectangle drawing object 102 is defined by RGB data (22, 88, 77) and there are three pixels over an extent from the X21 coordinate to the X22 coordinate, where that extent corresponds to the width of the incoming rectangle drawing object 102.

As shown in FIG. 9, the one-line raster image data associated with the incoming rectangle drawing object 102 may be merged with one-line raster image data associated with the current rectangle drawing object 100 and previously stored in the one-line raster image buffer 32 to generate a merged one-line raster image data associated with the current and incoming rectangle drawing objects 100 and 102. As noted above, the merged one-line raster image data may contain any suitable "dummy" data representing the area 104 between the two rectangle drawing objects 100 and 102 where they are not connected and do not overlap each other. FIG. 9 depicts an example of a one-line raster image 106 corresponding to the merged one-line raster image data associated with the current and incoming rectangle drawing objects 100 and 102. As shown in FIG. 9, the one-line raster image 106 contains no image data in an image portion corresponding to the area 104.

Further, when the current and the incoming rectangle drawing objects 100 and 102 satisfy the predetermined condition, a clip region 108 (see FIG. 10) corresponding to the current and incoming rectangle drawing objects 100 and 102 is generated. As described above in connection with FIGS. 4 and 5, the clip region 108 shown in FIG. 10 may be defined using scanlines. Namely, each of the rectangle drawing objects 100 and 102 may be rendered to respective scanlines and the respective scanlines for each of the rectangle drawing objects may be added to one scanline table, such as the clip-region scanline table 34.

As shown in FIG. 10, since the two rectangle drawing objects 100 and 102 are not connected and do not overlap each other, the clip region 108 corresponding to the current rectangle drawing object 100 and the incoming rectangle object 102 is made up of two individual clip regions, namely, a first clip region corresponding to the current rectangle drawing object 100 and a second clip region corresponding to the incoming rectangle drawing object 102. Here, merging of scanlines, as described above in connection with FIG. 5, is not carried out during a clip region generating process since scanlines associated with the current rectangle drawing objet 100 and scanlines associated with the incoming rectangle drawing object 102 do not overlap each other and are not connected.

Referring back to FIG. 9, after the one-line raster image data associated with the rectangle drawing objects 100 and 102 and the clip region 108 for those two rectangle drawing objects are generated, the one-line raster image data may be used together with the clip region to fill a clipped drawing region corresponding to the rectangle drawing objects 100 and 102. Namely, as explained above, the clipped drawing region may be filled with the one-line raster image data by referring to the clip-region scanline table 34 holding scanline data defining the clip region 108. In this regard, the clipped drawing region may be filled on a line-by-line basis by sequentially reading start and end coordinates of every scanline of the clip region 108 and filling the clipped drawing region with either a portion or the entirety of the one-line scanline data depending on the start and end coordinates of a scanline being processed.

More particularly, with reference to FIGS. 9 and 10, coordinates of a scanline 110 associated with the incoming rectangle drawing object 102 would be read first. Since the scanline 110 extends between the X21 and X22 coordinates, only that portion of the one-line raster image data corresponding to pixels over an extent from the X21 coordinate to the X22 coordinate (where that extent corresponds to the width of the incoming rectangle drawing object 102) would be used to fill the clipped drawing region. The remaining portion of the one-line raster image data falling outside that range would be discarded. The filling operation for subsequent scanlines corresponding only to the rectangle drawing object 102 would be carried out the same way.

Then, in an area where the two rectangle drawing objects 100 and 102 overlap in their extent (see the area 104 in FIG. 9), the entirety of the one-line raster image data would be used for filling the clipped drawing region over an extent between X11 (i.e., a start x-coordinate of a scanline 112 associated with the current rectangle drawing object 100) and X22 (i.e., an end x-coordinate of the scanline 110 associated with the incoming rectangle drawing object 102). The filling operation for subsequent scanlines falling within the area 104 would be carried out the same way. Then, remaining scanlines associated only with the current rectangle drawing object 100 would be processed as described above, i.e., by keeping only that portion of the one-line raster image data corresponding to pixels over the extent from the X11 coordinate to the X12 coordinate, while discarding the remaining portion of the one-line raster image data falling outside that range.

Figure 11:
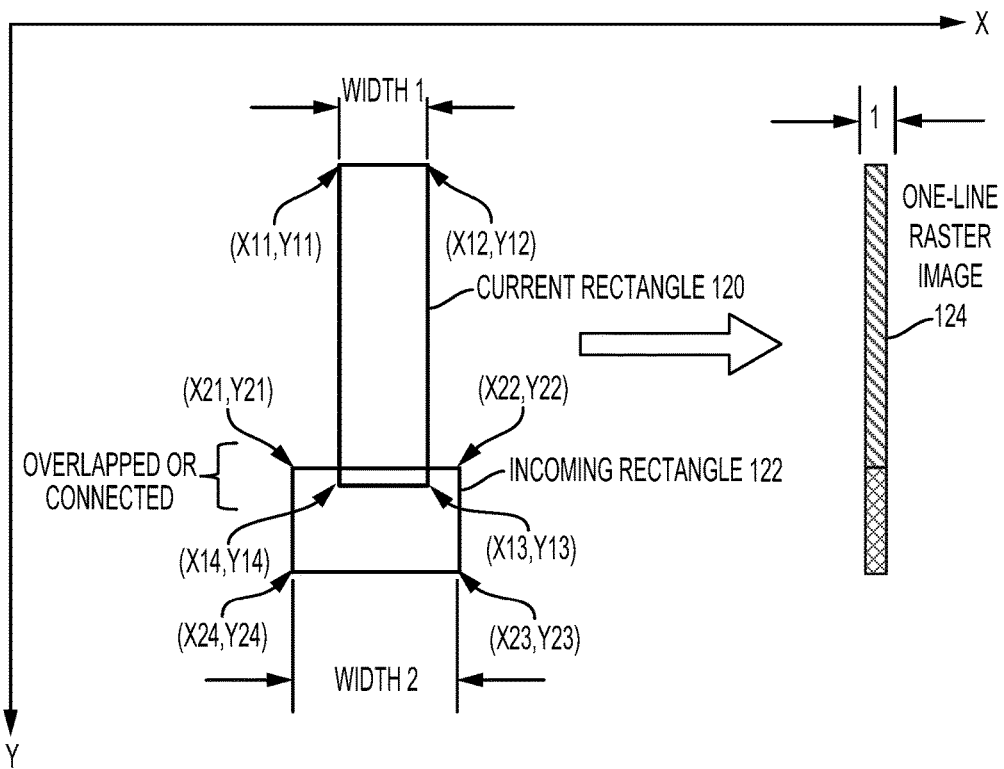
FIG. 11 illustrates one example in which a one-line raster image is generated for two rectangle drawing objects that are positioned along a y-axis defining a vertical direction and that satisfy a predetermined condition, in accordance with an example embodiment.
Figure 12:
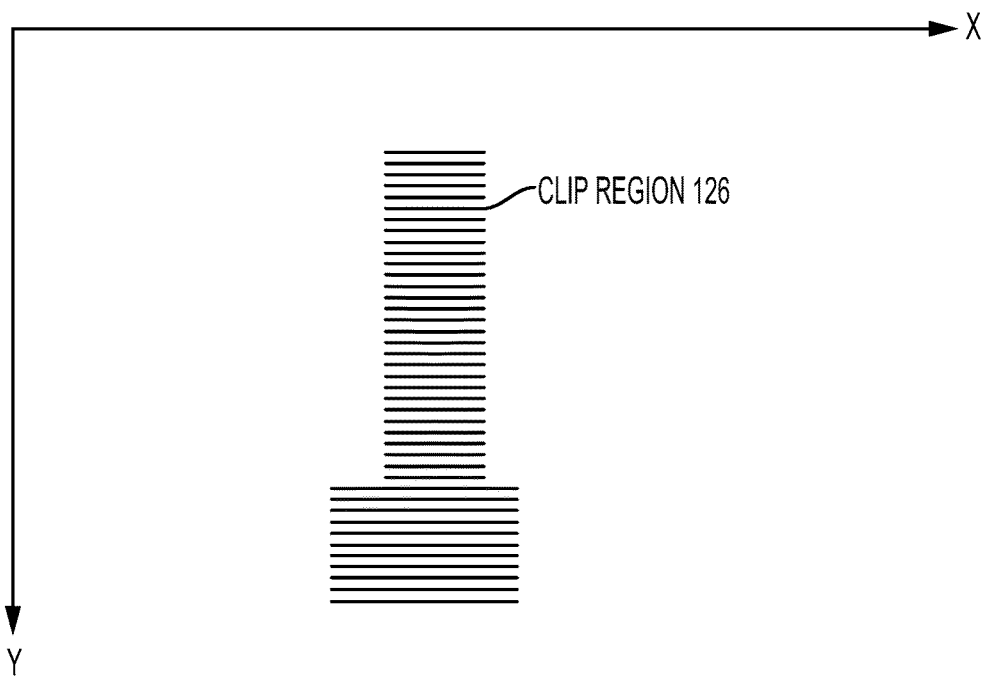
FIG. 12 illustrates a clip region corresponding to the two rectangle drawing objects illustrated in FIG. 9.

FIG. 11 illustrates one example in which a one-line raster image is generated for two rectangle drawing objects that are positioned along the y-axis defining the vertical direction and that satisfy a predetermined condition, in accordance with an example embodiment. Further, FIG. 12 illustrates a clip region corresponding to the two rectangle drawing objects illustrated in FIG. 11. Note, however, that in other examples, more rectangle drawing objects may exist.

Similar to FIG. 4, a width of each of the current and incoming rectangle drawing objects 120 and 122 extends in the horizontal direction, and a height of each of the current and incoming rectangle drawing objects 120 and 122 extends in the vertical direction. FIG. 11 illustrates an example in which the predetermined condition holds that: (i) the current rectangle drawing object 120 and the incoming rectangle drawing object 122 are parallel with the y-axis, (ii) along the horizontal direction, a length (or in this case, the width) of the current rectangle drawing object 120 (denoted as "WIDTH 1") is less than or equal to a length (or in this case, the width) of the incoming rectangle drawing object 122 (denoted as "WIDTH 2"), and (iii) the current rectangle drawing object 120 and the incoming rectangle drawing object 120 are connected or overlap each other in the vertical direction.

In the example of FIG. 11, with respect to item (ii), in order to meet the predetermined condition, the X14 coordinate, for instance, would be greater than or equal to or the X21 coordinate, whereas the X13 coordinate, for instance, would be less than or equal to the X22 coordinate. As such, the predetermined condition requires that an x-axis range (or, in this case, horizontal range) of the current rectangle drawing object 120 falls within an x-axis range (or, in this case, horizontal) of the incoming rectangle drawing object 122. In other words, the x-axis range of the current rectangle drawing object 120 is less than or equal to the x-axis range of the incoming rectangle drawing object 122.

Accordingly, since the current and incoming rectangle drawing objects 120 and 122 satisfy the predetermined condition, one-line raster image data associated with the current and the incoming rectangle drawing objects 120 and 122 is generated and stored in the one-line raster image buffer 32. In this regard, the one-line raster image data indicates a filling color of the incoming rectangle drawing object 122 over the height of the incoming rectangle drawing object 122. In the raster format, the height of the incoming rectangle drawing object 122 may be defined by a given number of pixels and the one-line raster image data will then include color data for each of those pixels for a single raster image line that is one-pixel wide.

As shown in FIG. 11, the one-line raster image data associated with the incoming rectangle drawing object 122 may be merged with one-line raster image data associated with the current rectangle drawing object 120 and previously stored in the one-line raster image buffer 32 to generate a merged one-line raster image data associated with the current and incoming rectangle drawing objects 120 and 122. To illustrate, FIG. 11 depicts an example of a one-line raster image 124 corresponding to the merged one-line raster image data associated with the current and incoming rectangle drawing objects 120 and 122.

If the current and incoming rectangle drawing objects 120 and 122 are connected, the one-line raster image data associated with the current rectangle drawing object 100 may indicate a filling color of the current rectangle drawing object 100 over the height of the current rectangle drawing object 100. If, on the other hand, the current and incoming rectangle drawing objects 100 and 122 overlap each other, in an area of overlap, a color of overlapping pixels may correspond to a rectangle filling color of a rectangle drawing object processed last. Accordingly, in the example of FIG. 11, in the area of overlap, the merged one-line raster image data may include color data corresponding to the filling color of the incoming rectangle drawing object 122.

It should be understood, however, that in other examples, the merged one-line raster image data could include one-line raster image data for more than two rectangle drawing objects as more incoming rectangle drawing objects satisfying the predetermined condition are processed.

Further, when the current and the incoming rectangle drawing objects 120 and 122 satisfy the predetermined condition, a clip region 126 (see FIG. 12) corresponding to the current and incoming rectangle drawing objects 120 and 122 is generated. As described above in connection with FIGS. 4 and 5, the clip region 126 shown in FIG. 12 may be defined using scanlines.

Namely, each of the rectangle drawing objects 120 and 122 may be rendered to respective scanlines and the respective scanlines for each of the rectangle drawing objects may be added to one scanline table, such as the scanline table 34. In this regard, as previously described, a clip region corresponding to the rectangle drawing object 120 may be updated to include a clip region corresponding to the incoming second rectangle drawing object 122 to generate an updated clip region corresponding to the current and incoming rectangle drawing objects 120 and 122. As noted above, the clip region updating process may include merging scanlines associated with one rectangle drawing object with scanlines associated with another rectangle drawing object.

Figure 13:
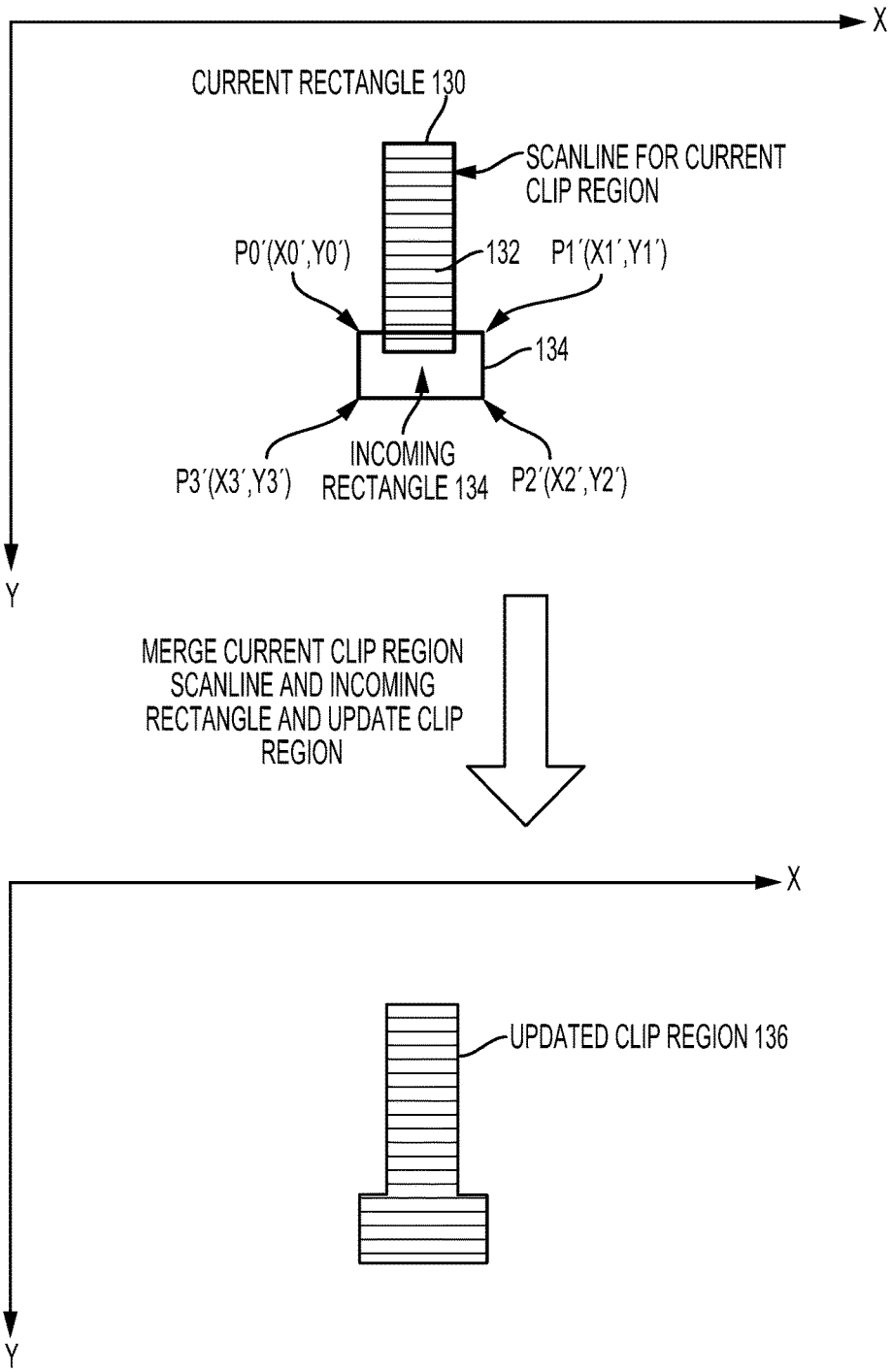
FIG. 13 illustrates an example of updating a clip region in a vertical case in which rectangle drawing objects are positioned along a vertical direction and overlap each other.

FIG. 13 illustrates an example of updating a clip region in a vertical case in which rectangle drawing objects are positioned along a vertical direction (e.g., the y-axis direction) and overlap each other. As shown in FIG. 13, a current rectangle drawing object 130 is first rendered to scanlines defining a current clip region 132. Then, an incoming rectangle drawing object 134 that overlaps the current rectangle drawing object 130 is processed by rendering the incoming rectangle drawing object 134 to scanlines and merging scanlines defining the current clip region 130 with scanlines for the incoming rectangle drawing object 134 to produce an updated clip region 136 corresponding to both the current rectangle drawing object 130 and the incoming rectangle drawing object 134.

In this regard, when the scanlines associated with the incoming rectangle drawing object 130 are combined with the scanlines associated with the current rectangle drawing object 134 in a scanline table, such as the scanline table 34, those scanlines that fall within an area of overlap between those two rectangle drawing objects may be merged together. Horizontal scan lines can be used to define the filling area of the one-line raster, even if the one-line raster relates to one vertical line—in this case, the one-line raster can have enough horizontal scanlines to cover the vertical extent or height of the one-line raster, where each horizontal scanline can have one pixel.

Referring back to FIG. 11, after the one-line raster image data 124 associated with the rectangle drawing objects 120 and 122 and the clip region 126 for those two rectangle drawing objects are generated, the one-line raster image data may be used together with the clip region 126 to fill a clipped drawing region corresponding to the rectangle drawing objects 120 and 122. Namely, the clipped drawing region may be filled with the one-line raster image data by referring to the scanline table 34 holding scanline data defining the clip region 126.

Similar to a horizontal case described in connection with FIGS. 4 and 5, for a vertical case of FIGS. 11 and 12, the clipped drawing region may be filled on a line-by-line basis by sequentially reading start and end coordinates of every scanline of the clip region 126 and filling the clipped drawing region with either a portion or the entirety of the one-line scanline data depending on the start and end coordinates of a scanline being processed.

Figure 14:
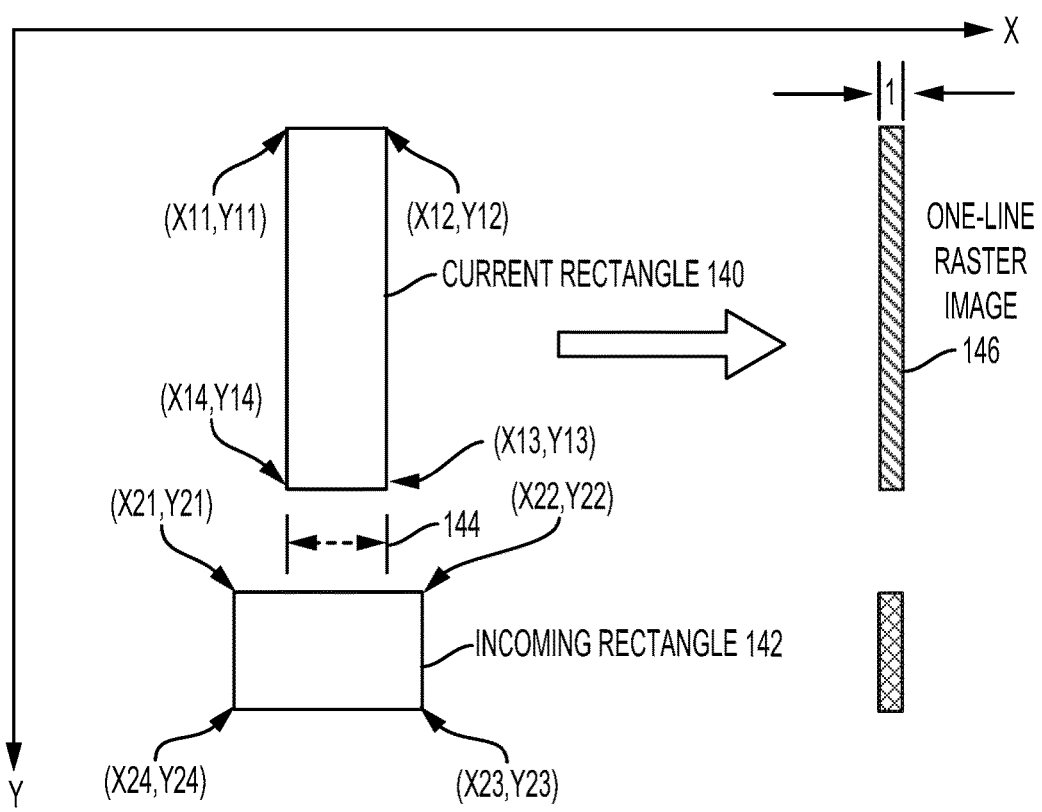
FIG. 14 illustrates another example in which a one-line raster image is generated for two rectangle drawing objects satisfying a predetermined condition and positioned along the y-axis that defines the vertical direction, in accordance with an example embodiment.
Figure 15:
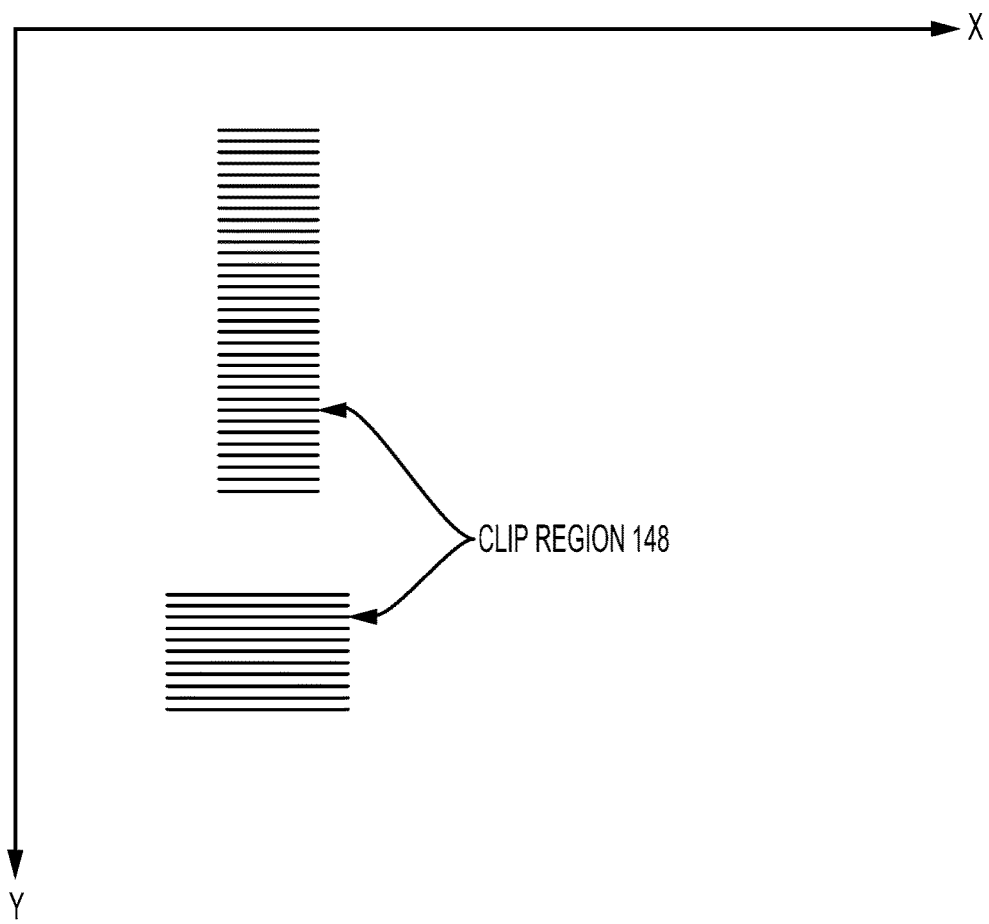
FIG. 15 illustrates a clip region corresponding to the two rectangle drawing objects illustrated in FIG. 14.

FIG. 14 illustrates another example in which a one-line raster image is generated for two rectangle drawing objects satisfying a predetermined condition and positioned along the y-axis that defines the vertical direction, in accordance with an example embodiment. Further, FIG. 15 illustrates a clip region corresponding to the two rectangle drawing objects illustrated in FIG. 14. Note, however, that in other examples, more rectangle drawing objects may exist.

As shown in FIG. 14, a current rectangle drawing object 140 and an incoming rectangle drawing object 142 each have a width parameter and a height parameter. Similar to the example of FIG. 11, the width of each of the current and incoming rectangle drawing objects 140 and 142 extends in the horizontal direction, and the height of each of the current and incoming rectangle drawing objects 140 and 142 extends in the vertical direction.

FIG. 14 illustrates an example in which the predetermined condition may hold that: (i) the current rectangle drawing object 140 and the incoming rectangle drawing object 142 are parallel with the x-axis, (ii) along the horizontal direction, an overlap exists between an extent of the current rectangle drawing object 140 and an extent of the incoming rectangle drawing object 102, and (iii) the current rectangle drawing object 140 and the incoming rectangle drawing object 132 are not connected and do not overlap each other in the vertical direction.

With respect to item (ii), FIG. 14 shows an area 144 that represents the overlap between the extent of the current rectangle drawing object 140 and the incoming rectangle drawing object 142 along the horizontal direction. In other words, an overlap exists between at least a side portion of the current rectangle drawing object 140 and at least a side portion of the incoming rectangle drawing object 142 along the horizontal direction, where those two rectangle drawing objects are not connected and do not overlap each other in the vertical direction.

When the current and the incoming rectangle drawing objects 140 and 142 satisfy the predetermined condition, one-line raster image data associated with the current and the incoming rectangle drawing objects 140 and 142 is generated and stored in the one-line raster image buffer 32. In this regard, since the two rectangle drawing objects are not connected and do not overlap each other along the y-axis, the one-line raster image data indicates a filling color of the current rectangle drawing object 140 over the height of current rectangle drawing object 140 and a filling color of the incoming rectangle drawing object 142 over the height of the incoming rectangle drawing object 142. As explained above, in the raster format, the height of each rectangle drawing object 140 and 142 may be defined by a given number of pixels, and the one-line raster image data will include color data for each of those pixels for a single raster image line that is one-pixel wide.

As further shown in FIG. 14, in the area 144 where no connection or overlap exists between the two rectangle drawing objects 140 and 142 along the y-axis, the one-line raster image data will contain no pixel color data. Rather, in place of pixel data, the one-line raster image data may contain any suitable "dummy" data to indicate an area of separation (e.g., over an extent of a given number of pixel units) between the two rectangle drawing objects 130 and 132.

Similar to the other examples above, one-line raster image data associated with the incoming rectangle drawing object 142 may be merged with one-line raster image data associated with the current rectangle drawing object 140 and previously stored in the one-line raster image buffer 32 to generate a merged one-line raster image data associated with the current and incoming rectangle drawing objects 140 and 142. As noted above, the merged one-line raster image data may contain any suitable "dummy" data representing the area 144 between the two rectangle drawing objects 140 and 142 where they are not connected and do not overlap with each other. FIG. 14 depicts an example of a one-line raster image 146 corresponding to the merged one-line raster image data associated with the current rectangle drawing object 140 and the incoming rectangle drawing object 142. As shown in FIG. 14, the one-line raster image 146 contains no image data in an image portion corresponding to the area 144.

Further, when the current and the incoming rectangle drawing objects 140 and 142 satisfy the predetermined condition, a clip region 148 (see FIG. 15) corresponding to the current and incoming rectangle drawing objects 100 and 102 is generated. As described above in connection with FIGS. 9 and 10, the clip region 148 shown in FIG. 15 may be defined using scanlines. Namely, each of the rectangle drawing objects 140 and 142 may be rendered to respective scanlines and the respective scanlines for each of the rectangle drawing objects may be added to one scanline table, such as the clip-region scanline table 34.

As shown in FIG. 15, since the two rectangle drawing objects 140 and 142 are not connected and do not overlap each other, the clip region 148 corresponding to the current rectangle drawing object 140 and the incoming rectangle object 142 is made up of two individual clip regions, namely, a first clip region corresponding to the current rectangle drawing object 140 and a second clip region corresponding to the incoming rectangle drawing object 142. Here, merging of scanlines, as described above in connection with other examples, is not carried out during a clip region generating process since scanlines associated with the current rectangle drawing objet 140 and scanlines associated with the incoming rectangle drawing object 142 do not overlap each other and are not connected.

After the one-line raster image data associated with the rectangle drawing objects 140 and 142 and the clip region 148 for those two rectangle drawing objects are generated, the one-line raster image data may be used together with the clip region 148 to fill a clipped drawing region corresponding to the rectangle drawing objects 140 and 142. Namely, as explained above, the clipped drawing region may be filled with the one-line raster image data by referring to the clip-region scanline table 34 holding scanline data defining the clip region 148.

Similar to a horizontal case described in connection with FIGS. 9 and 10, for a vertical case of FIGS. 14 and 15, the clipped drawing region may be filled on a line-by-line basis by sequentially reading start and end coordinates of every scanline of the clip region 148 and filling the clipped drawing region with either a portion or the entirety of the one-line raster image data associated with the rectangle drawing objects 140 and 142 depending on the start and end coordinates of a scanline being processed.

Figure 16:
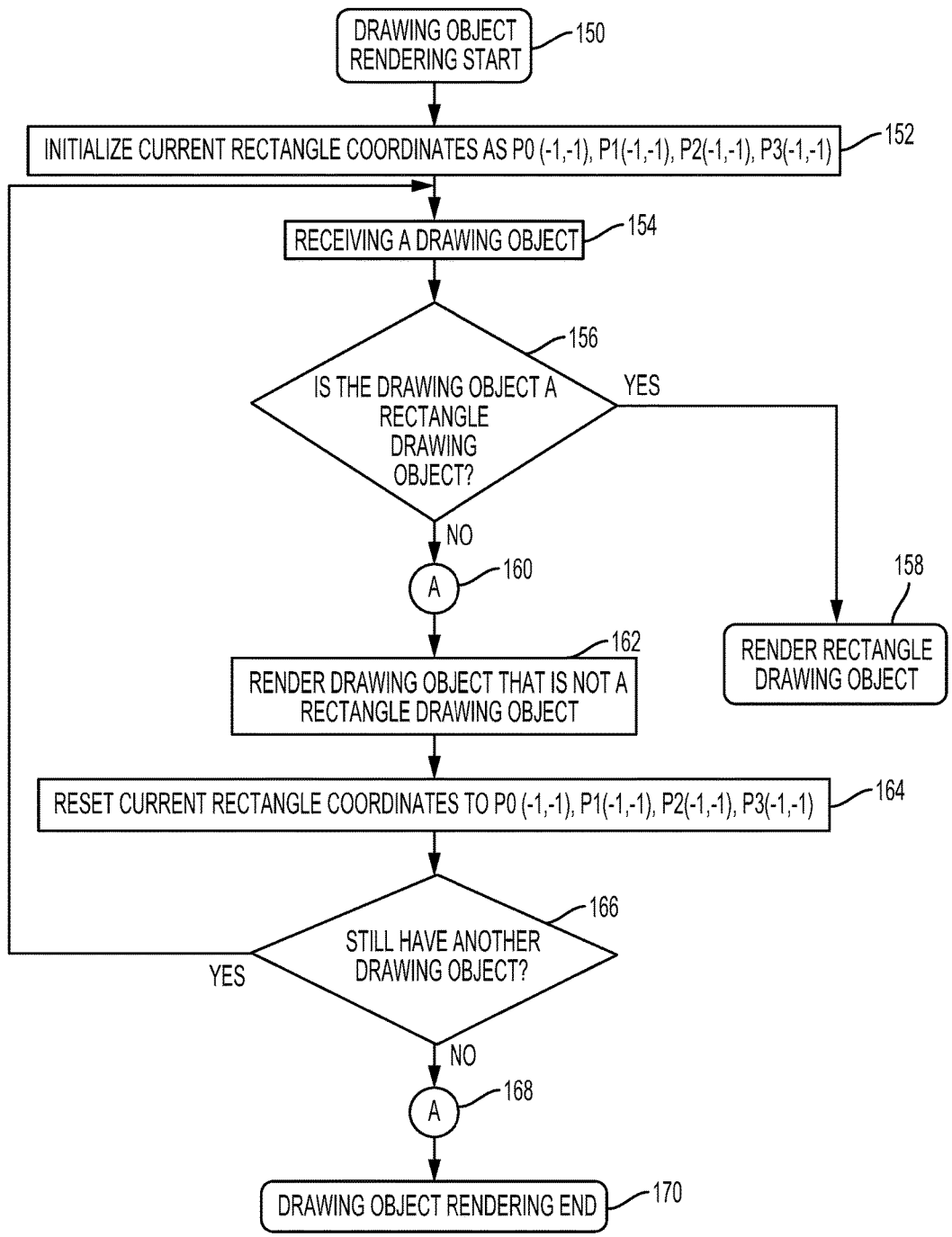
FIG. 16 depicts a top-level process for rendering a drawing object, in accordance with an example embodiment.
Figure 17:
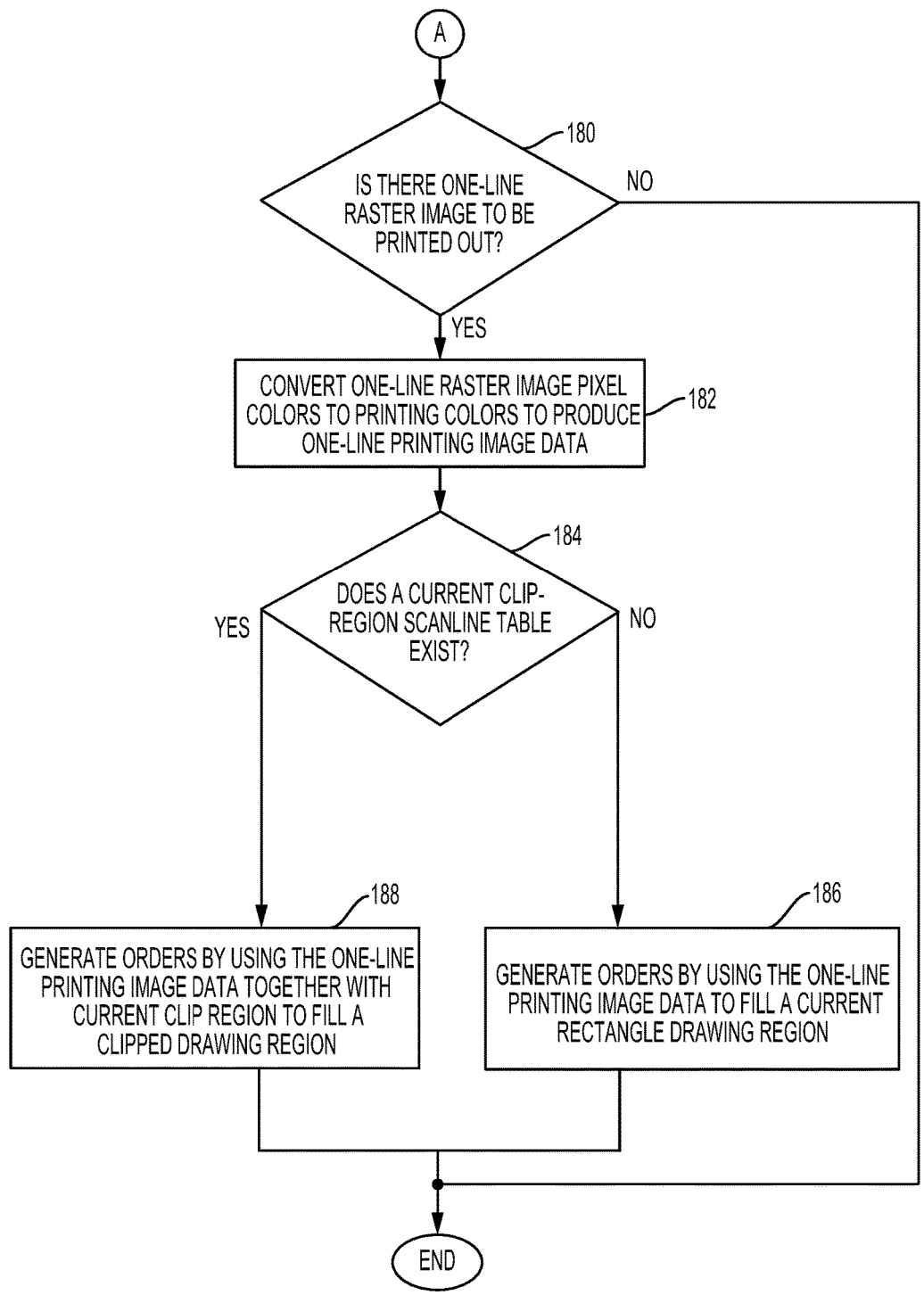
FIG. 17 illustrates a process related to using one-line raster image for generating orders for rectangle filling, in accordance with an example embodiment.
Figure 18:
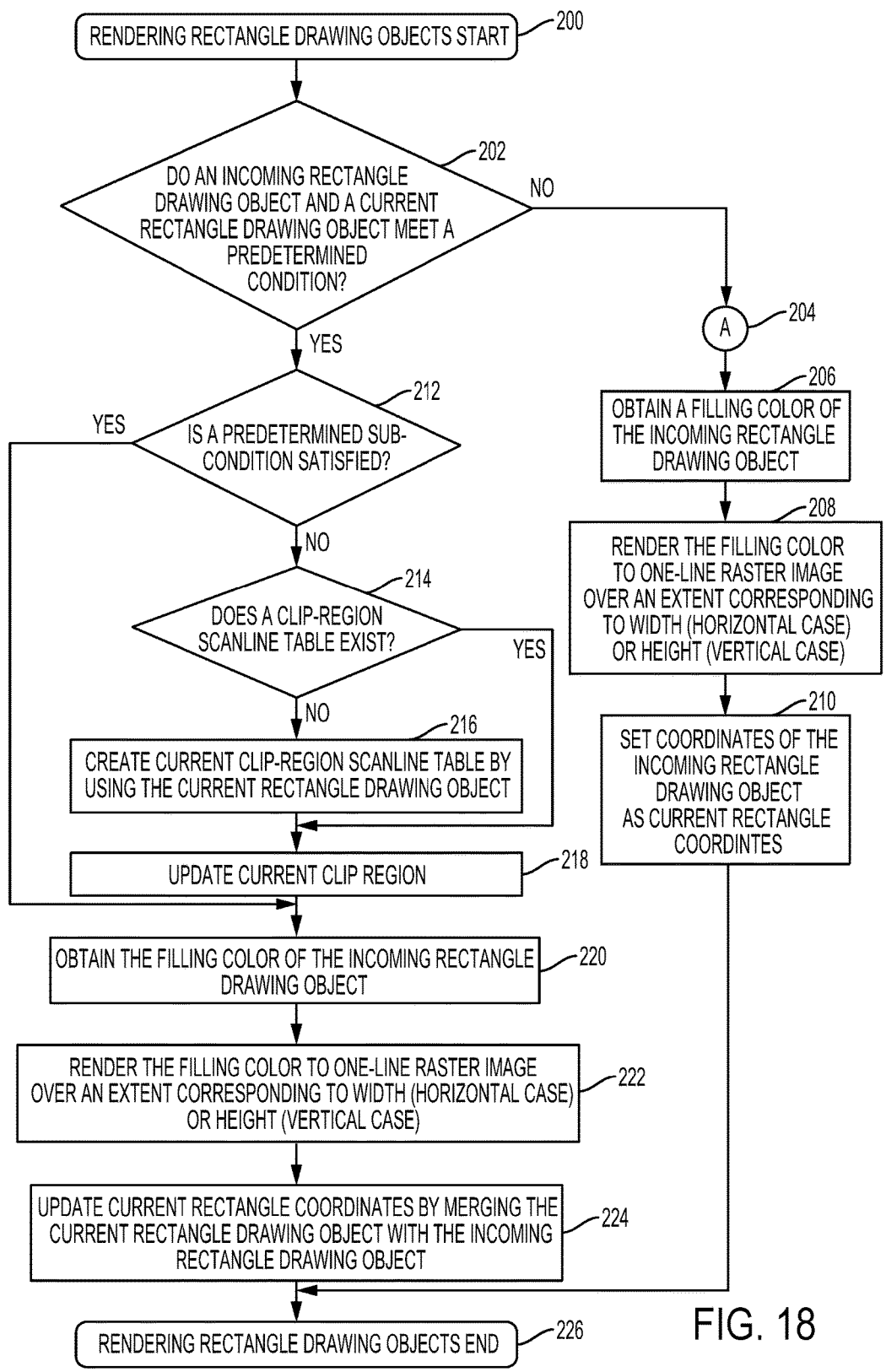
FIG. 18 is a flowchart depicting a process of rendering a rectangle drawing object for either a horizontal case in which rectangle drawing objects are positioned along a horizontal direction defined by the x-axis or a vertical case in which rectangle drawing objects are positioned along a vertical direction defined by the y-axis, in accordance with an example embodiment.

FIGS. 16-18 are additional flow charts depicting various processes that could be carried out in accordance with one or more example embodiments by the rectangle rendering unit 34, such as in connection with horizontal and vertical cases shown in FIGS. 4, 9, 11, and 14.

FIG. 16 depicts a top-level process for rendering a drawing object, in accordance with an example embodiment. At step 150, rendering of the drawing object starts. At step 152, current rectangle coordinates for a rectangle drawing object are initialized (e.g., as P0(−1,−1),P1(−1,−1),P2(−1,−1),P3(−1,−1)), where P0-P3 correspond to four points defining a rectangle, and X and Y coordinates of each point are set to some default value outside of a valid coordinate range for a page. At step 154, a drawing object is received. At step 156, a determination is made as to whether the drawing object is a rectangle drawing object. Details of this determination are described in copending U.S. patent application Ser. No. 14/923,924 (hereinafter, "the '924 Application"), filed on Oct. 27, 2015, the entirety of which is hereby incorporated by reference.

If a result of the determination at step 156 is that the drawing object is a rectangle drawing object, at step 158, a process of rendering the rectangle drawing object is executed. The process of rendering rectangle drawing object is shown in FIG. 18 for horizontal and vertical cases, as will be described later. On the other hand, if the result of the determination at step 156 is that the drawing object is not a rectangle drawing object, the flow moves to step 160 at which a process designated by "A" and illustrated in FIG. 17 is executed. The process A illustrated in FIG. 17 is related to using one-line raster image for generating orders for rectangle filling.

Following the step 160, at step 162, the drawing object that is not a rectangle drawing object is rendered. Once the non-rectangle drawing object is rendered, at step 164, the current rectangle coordinates are reset (e.g., to P0(−1,−1), P1(−1,−1),P2(−1,−1),P3(−1,−1)). Once the coordinates are reset at step 164 or the rectangle drawing object rendering process at step 158 is executed, the flow moves to step 166 at which a decision is made as to whether there is still another drawing object to be processed. If another incoming drawing object exists, then the flow returns to step 154. If another incoming drawing object does not exist, then, at step 168, the process A is executed again. The rendering of the drawing object ends at step 170.

The process A shown in FIG. 17 will now be described. At step 180, a determination is made if there is a one-line raster image to be printed out. As noted above, the process A follows the determination that the drawing object is not a rectangle drawing object. Thus, at this time, any one-line raster image data corresponding to the one-line raster image and held in the one-line raster image buffer 32 is to undergo a conversion to printing colors and orders for the one-line raster image will be generated. Hence, step 180 involves checking whether there is any one-line raster image data held in the one-line raster image buffer 32 to be printed out. If not, the process ends.

If the one-line raster image is to be printed out, at step 182, one-line raster image pixel colors are converted to printing colors to produce one-line printing image data. Then, at step 184, a determination is made as to whether a current clip-region scanline table holding scanline data defining a current clip region exists. If not, at step 186, orders (or printing commands) are generated by using the one-line printing image data to fill a current rectangle drawing region corresponding to a current rectangle drawing object that was processed previously.

Namely, the step 186 refers to a rectangle drawing region filling process described in detail in the '924 Application, referenced above. In summary, as described in the '924 Application, in some instances, when multiple rectangle drawing objects meet a predetermined condition, such rectangle drawing objects may be drawn by using one-line raster image data associated with those rectangle drawing objects a number of times to fill a rectangle drawing region corresponding to the rectangle drawing objects. The example predetermined condition described in the '924 Application holds that the rectangle drawing objects (i) are parallel with respect to a first direction (e.g., a horizontal x-axis direction), (ii) have equal length along a second direction (e.g., a vertical y-axis direction) that is perpendicular (or orthogonal) to the first direction, (iii) are positioned same way along the second direction, and (iv) are connected or overlap each other in the first direction. As described in the '924 Application, the generated orders represent printing commands may specify a number of times that the one-line printing image data will need to be used over an extent corresponding to either height (as in the horizontal case) or width (as in the vertical case) to fill the rectangle drawing region.

Hence, if at step 184 no current clip-region scanline table exists, step 186 is taken to use the one-line printing image data is in the manner described in the '924 Application. Otherwise, at step 188, orders (or printing commands) are generated by using the one-line printing image data together with a current clip region generated based on previously processed rectangle drawing objects to fill a clipped drawing region. As described above, the filling process can be carried on a line-by-line basis by reading scanline parameters held in the current clip-region scanline table and filling the clipped drawing region with either a portion or the entirety of the one-line printing image data. In this regard, the generated orders represent printing commands that at least in part may specify an extent of the one-line printing image data is to be used to fill each respective line of the clipped drawing region.

FIG. 18 is a flowchart depicting a process of rendering a rectangle drawing object for either a horizontal case in which rectangle drawing objects are positioned along a horizontal direction defined by the x-axis or a vertical case in which rectangle drawing objects are positioned along a vertical direction defined by the y-axis, in accordance with an example embodiment. The predetermined condition could be one of the conditions described above for horizontal and vertical cases. At step 200, rendering of rectangle drawing object starts. At step 202, a determination is made as to whether a predetermined condition is satisfied by an incoming rectangle drawing object and a current rectangle drawing object. By way of example, with reference to FIG. 4 illustrating one example horizontal case, a determination is made as to whether (i) the current rectangle drawing object 50 and the incoming rectangle drawing object 52 are parallel with the x-axis, (2) along the vertical direction, the height of the current rectangle drawing object 50 is equal to or smaller than the height of the incoming rectangle drawing object 52, and (iii) the current rectangle drawing object 50 and the incoming rectangle drawing object 52 are connected or overlap each other in the horizontal direction.

If the predetermined condition is not satisfied, at step 204, the flow moves to the process A described above. The predetermined condition would not be satisfied, for example, if the incoming rectangle drawing object is the very first rectangle drawing object to be processed. Following the process A, the flow moves to step 206 at which a filling color of the incoming rectangle drawing object is obtained, and at step 208, the filling color of the incoming rectangle drawing object is rendered to a one-line raster image over an extent corresponding to a width of the incoming rectangle drawing object for the horizontal case (e.g., from X21 to X22, as in FIG. 4) or over an extent corresponding to a height of the incoming rectangle for the vertical case (e.g., from Y21 to Y24, as in FIG. 11). At step 210, coordinates of the incoming rectangle drawing object are set as current rectangle coordinates (or coordinates of a current rectangle drawing object). This setting is based on the assumption that a next incoming rectangle drawing object will satisfy the predetermined condition so that a new sequence or group of rectangle drawing objects that satisfy the predetermined condition will be rendered as a new one-line raster image. Then, the flow moves to step 228 at which the rendering of rectangle drawing object ends.

If the predetermined condition is satisfied, the flow moves to step 212 at which a determination is made as to whether the incoming rectangle satisfies a predetermined sub-condition with respect to the current rectangle drawing object. Namely, the predetermined sub-condition may require that the current and incoming rectangle drawing objects (i) are parallel with respect to a first direction (e.g., a horizontal x-axis direction), (ii) have equal length along a second direction (e.g., a vertical y-axis direction) that is perpendicular (or orthogonal) to the first direction, (iii) are positioned in the same way along the second direction, and (iv) are connected or overlap each other in the first direction. As noted above, this sub-condition is described in detail in the '924 Application.

As used in the '924 Application and herein, plural rectangle drawing objects may be considered as being positioned same way along a given direction when a position of at least two respective vertices of each of the rectangle drawing objects along the given direction is the same (e.g., y-axis coordinates of two vertices of a first rectangle drawing object are the same as y-axis coordinates of two corresponding vertices of a second rectangle drawing object.)

Hence, for the horizontal case in the process illustrated in FIG. 18, the predetermined sub-condition may require that (i) the current and incoming rectangle drawing objects are parallel with the x-axis, (ii) a position of the incoming drawing object along the y-axis is the same as a position of the current rectangle drawing object along the y-axis, (iii) a height of the incoming rectangle drawing object is equal to a height of the current rectangle drawing object, and (iv) in the horizontal direction (or x-axis direction), the incoming rectangle drawing object is connected with the current rectangle drawing object or overlaps the current rectangle drawing object.

Similarly, for the vertical case in the process illustrated in FIG. 18, the predetermined sub-condition may require that (i) the current and incoming rectangle drawing objects are parallel with the y-axis, (ii) a position of the incoming drawing object along the x-axis is the same as a position of the current rectangle drawing object along the x-axis, (iii) a width of the incoming rectangle drawing object is equal to a width of the current rectangle drawing object, and (iv) in the vertical direction (or y-axis direction), the incoming rectangle drawing object is connected with the current rectangle drawing object or overlaps the current rectangle drawing object.

With a benefit of checking for the above-describe predetermined sub-condition, the process of rendering rectangle drawing objects may be further simplified. More specifically, such connected or overlapping rectangle drawing objects would have the same height or width, so that the entire one-line raster image data would be used to fill the whole drawing region corresponding to those rectangles. This eliminates a need to generate a clip region corresponding to those rectangle drawing objects and to reference a clip-region scanline table during filling. Hence rendering speed may be further improved. Details and various examples of the filling process in this case may be found in the '924 Application.

If the predetermined sub-condition is satisfied, the flow moves to step 220 at which the filling color of the incoming rectangle drawing object is obtained. As in step 208, at step 222, the filling color of the incoming rectangle drawing object is rendered to a one-line raster image over the extent corresponding to the width of the incoming rectangle drawing object for the horizontal case or over the extent corresponding to the height of the incoming rectangle for the vertical case. More specifically, raster image data is generated and stored in the one-line raster image buffer 32, where the raster image data includes pixel color data for each of the pixels over the width extent (for the horizontal case) or the height extent (for the vertical case). At this point, the one-line raster image buffer 32 would also hold raster image data for the current rectangle drawing object previously processed.

Then, at step 224, current rectangle coordinates are updated by merging coordinates of the current rectangle drawing object with coordinates of the incoming rectangle drawing object. When the predetermined sub-condition is satisfied, a process of updating current rectangle coordinates for both the horizontal and the vertical cases can be carried out as described in detail in the '924 Application. As noted in the '924 Application, by updating current rectangle coordinates, coordinates defining a rectangle drawing region to be printed out can be continuously updated each time another rectangle drawing object satisfying the predetermined condition is processed.

Referring back to step 212, if the predetermined sub-condition condition is not satisfied, the flow moves to step 214 at which a determination is made as to whether a clip-region scanline table exists. For example, the current-clip region would exist if there were at least two previously processed rectangle drawing objects meeting the predetermined condition. If the clip region scanline table does not exist, at step 216, the clip-region scanline table is created using the current rectangle drawing object, or a rectangle drawing object that was previously processed.

In this regard, the current rectangle drawing object is rendered to scanlines and scanline parameter data is stored to generate the clip region scanline table, such as the clip-region scanline table 36. If, however, the clip-region scanline table exists, at step 218, a current clip region defined by scanline data held in the clip-region scanline table is updated. An example of the process of updating a clip region in one horizontal case is described above in connection with 7. An example of the process of updating a clip region in one vertical case is described above in connection with FIG. 13.

The flow then moves to steps 220, 222, 224, and 226 described above. However, when at step 202 the predetermined sub-condition is not satisfied, the process of updating current rectangle coordinates in step 224 is carried out a different manner than described in the '924 Application.

Figure 19:
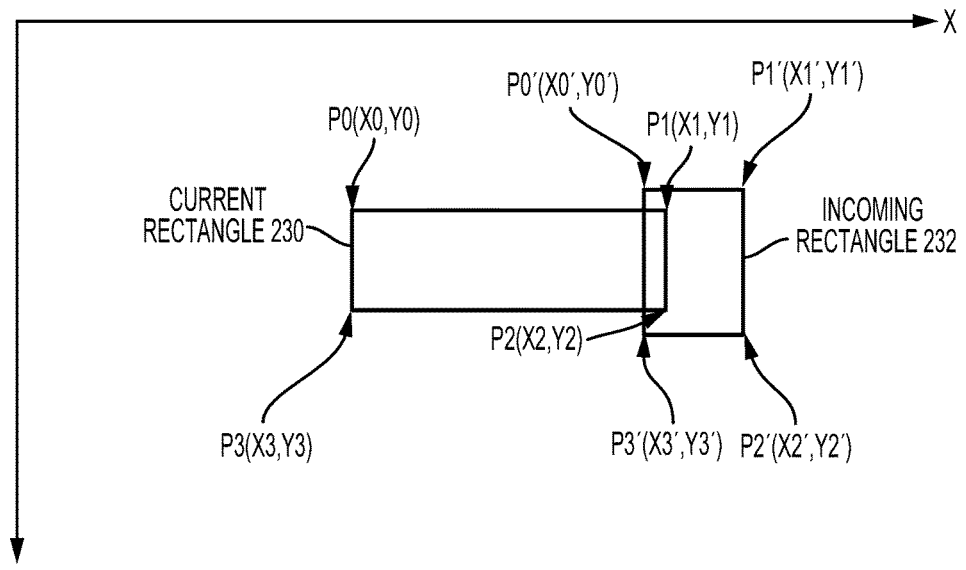
FIG. 19 illustrates an example of how to update current rectangle coordinates for the horizontal case in which two rectangle drawing objects overlap each other, in accordance with an example embodiment.
Figure 19:
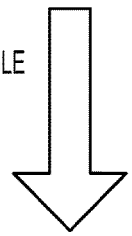
Figure 19:
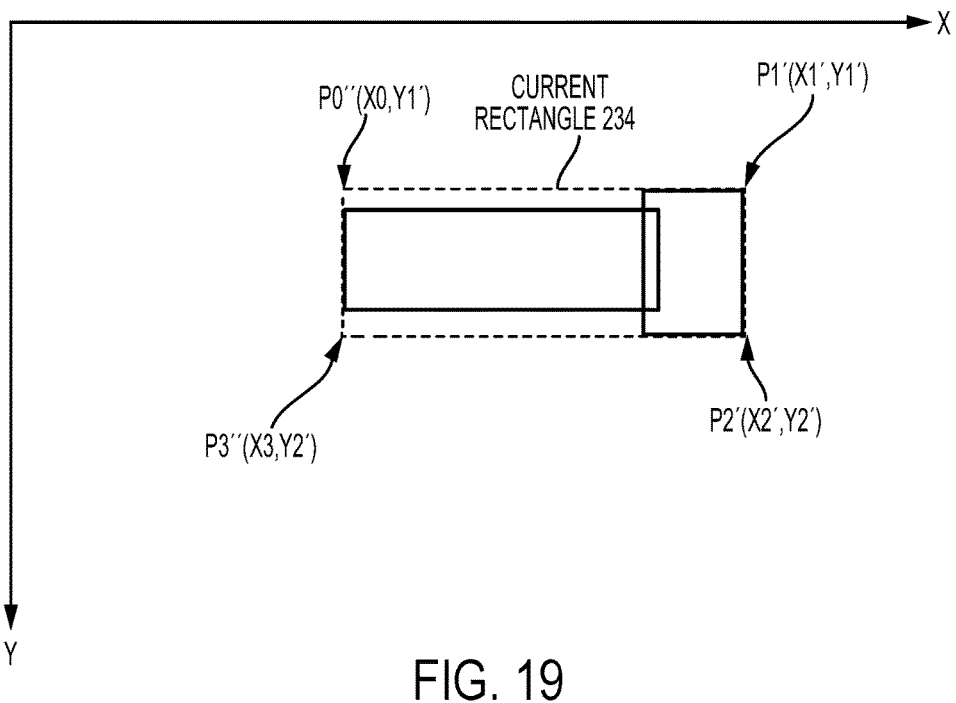

Namely, FIG. 19 illustrates an example of how to update current rectangle coordinates for the horizontal case in which two rectangle drawing objects overlap each other, in accordance with an example embodiment. As shown in FIG. 19, four points of a current rectangle drawing object 230 are P0, P1, P2, and P3 with their respective coordinates. Four points of an incoming rectangle drawing object 232 are P0', P1', P2', and P3' with their respective coordinates. As shown in FIG. 19, current rectangle drawing object coordinates and incoming rectangle drawing object coordinates are merged so that after the coordinates are merged, coordinates of a current rectangle area 234 (shown using dashed lines) correspond to coordinates of points P0", P1', P2', and P3".

Figure 20:
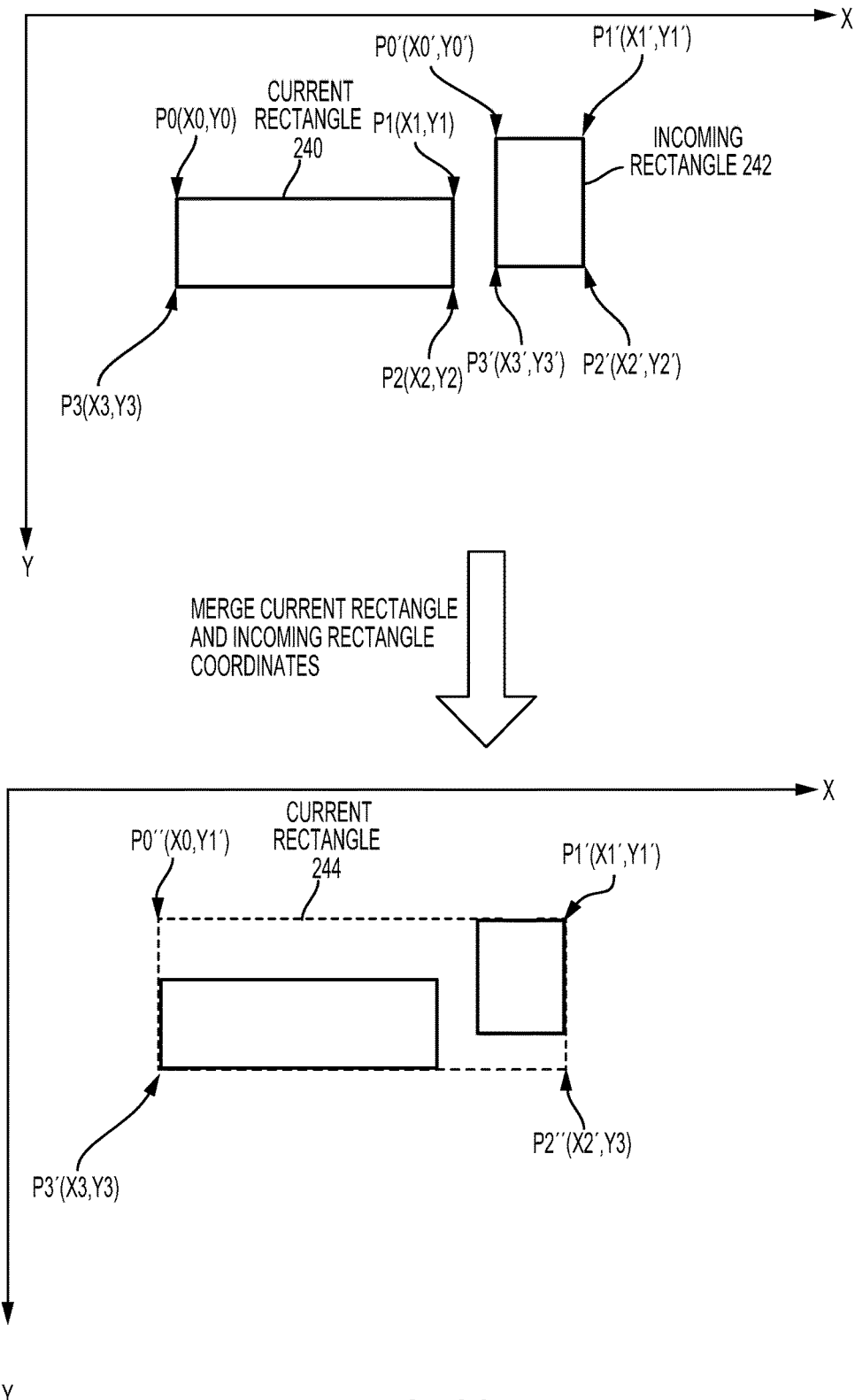
FIG. 20 illustrates an example of how to update current rectangle coordinates for the horizontal case in which two rectangle drawing objects are not connected and do not overlap each other, in accordance with an example embodiment.

FIG. 20 illustrates an example of how to update current rectangle coordinates for the horizontal case in which two rectangle drawing objects are not connected and do not overlap each other, in accordance with an example embodiment. As shown in FIG. 20, four points of a current rectangle drawing object 240 are P0, P1, P2, and P3 with their respective coordinates. Four points of an incoming rectangle drawing object 242 are P0', P1', P2', and P3' with their respective coordinates. As shown in FIG. 20, current rectangle drawing object coordinates and incoming rectangle drawing object coordinates are merged so that after the coordinates are merged, coordinates of a current rectangle area 244 (shown using dashed lines) correspond to coordinates of points P0", P1', P2", and P3'. Since the current and incoming rectangle drawing objects 240 and 244 are separated from one another, the current rectangle area 244 essentially "bounds" those two rectangle drawing objects so that both current and incoming rectangle drawing objects 240 and 242 are contained within the current rectangle area 244 corresponding to an updated current rectangle drawing object.

Figure 21:
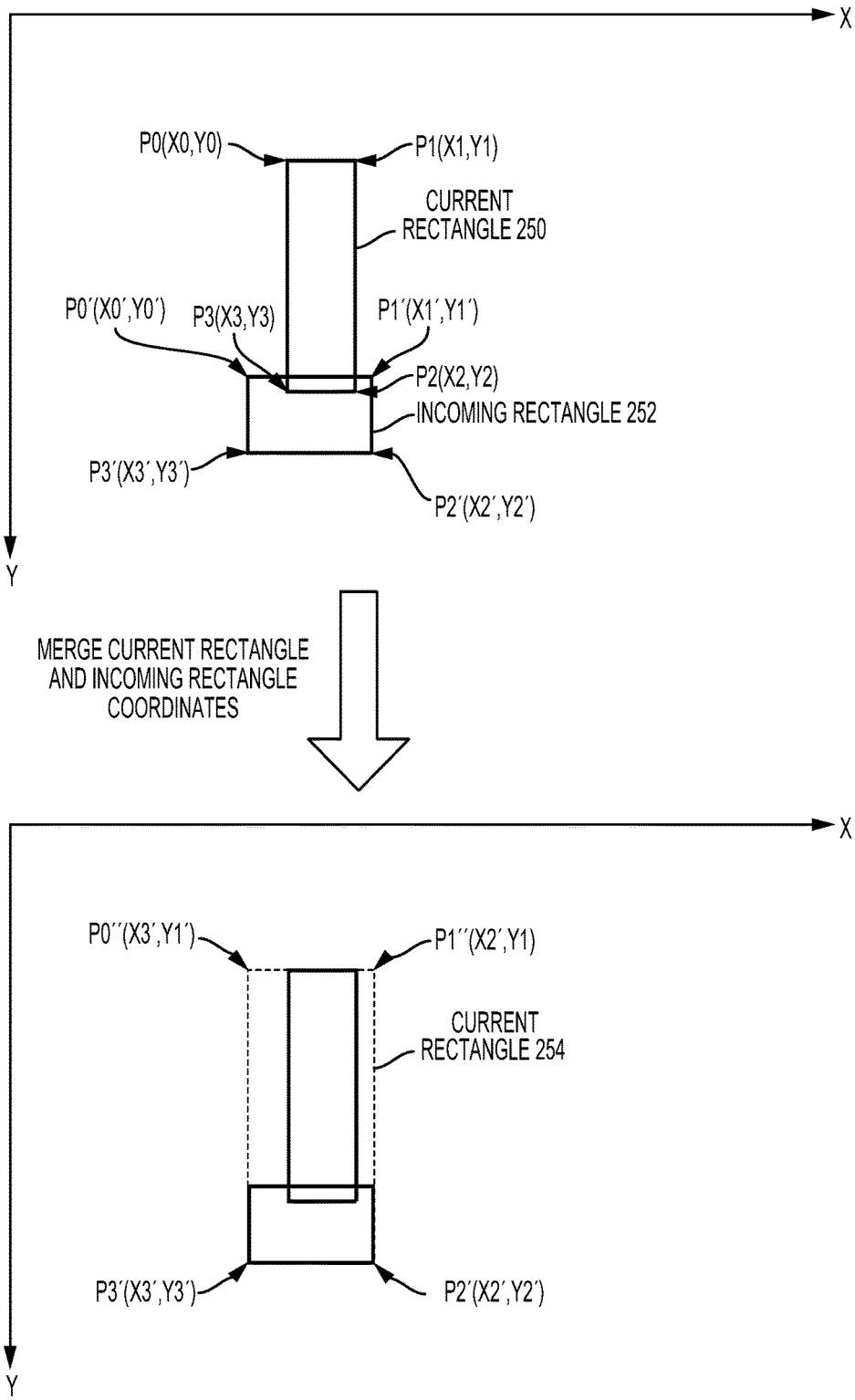
FIG. 21 illustrates an example of how to update current rectangle coordinates for the vertical case in which two rectangle drawing objects overlap each other, in accordance with an example embodiment.

FIG. 21 illustrates an example of how to update current rectangle coordinates for the vertical case in which two rectangle drawing objects overlap each other, in accordance with an example embodiment. As shown in FIG. 21, four points of a current rectangle drawing object 250 are P0, P1, P2, and P3 with their respective coordinates. Four points of an incoming rectangle drawing object 252 are P0', P1', P2', and P3' with their respective coordinates. As shown in FIG. 21, current rectangle drawing object coordinates and incoming rectangle drawing object coordinates are merged so that after the coordinates are merged, coordinates of a current rectangle area 254 (shown using dashed lines) correspond to coordinates of points P0", P1", P2', and P3".

Figure 22:
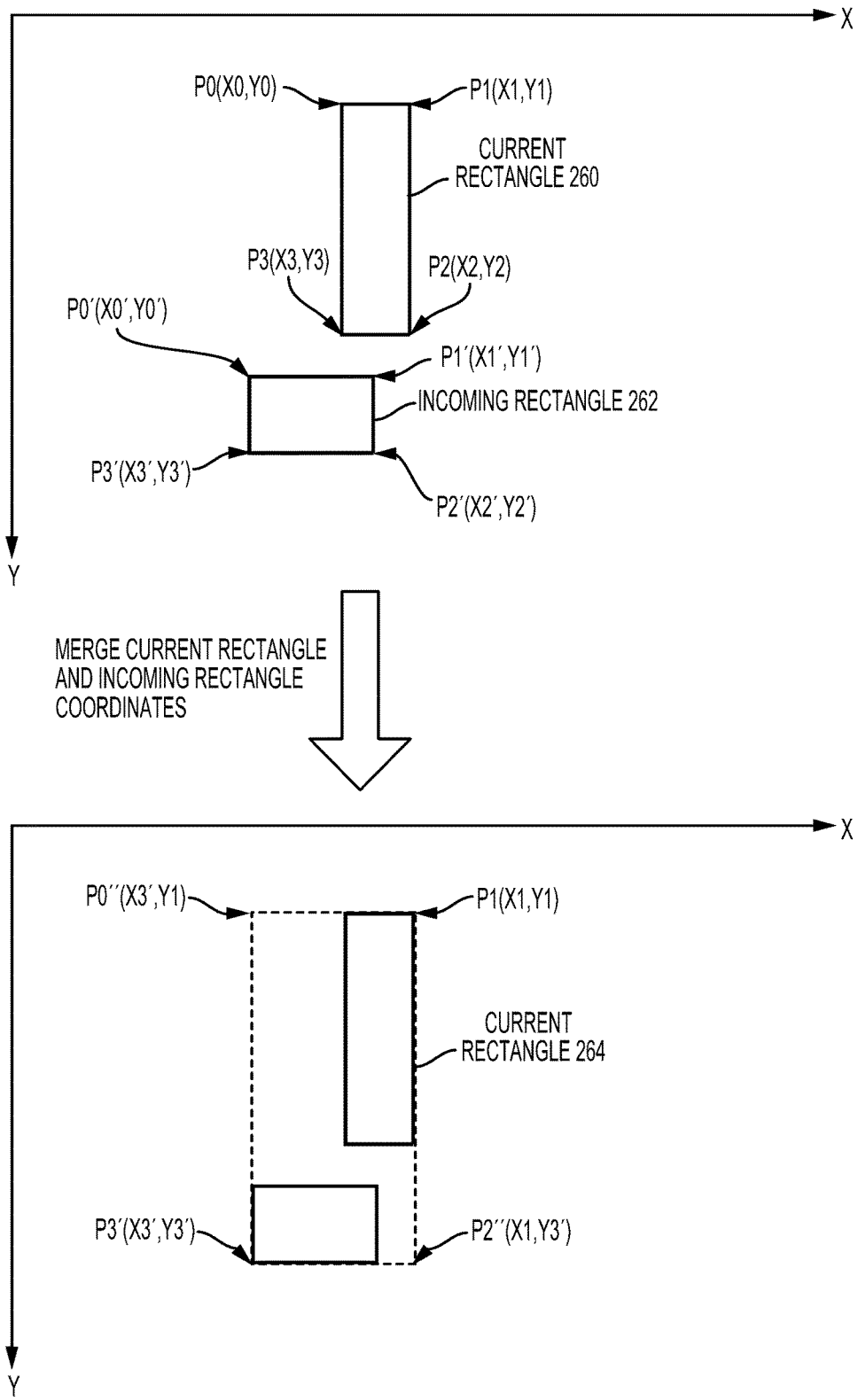
FIG. 22 illustrates an example of how to update current rectangle coordinates for the vertical case in which two rectangle drawing objects are not connected and do not overlap each other, in accordance with an example embodiment.

FIG. 22 illustrates an example of how to update current rectangle coordinates for the vertical case in which two rectangle drawing objects are not connected and do not overlap each other, in accordance with an example embodiment. As shown in FIG. 20, four points of a current rectangle drawing object 260 are P0, P1, P2, and P3 with their respective coordinates. Four points of an incoming rectangle drawing object 262 are P0', P1', P2', and P3' with their respective coordinates. As shown in FIG. 22, current rectangle drawing object coordinates and incoming rectangle drawing object coordinates are merged so that after the coordinates are merged, coordinates of a current rectangle area 264 (shown using dashed lines) correspond to coordinates of points P0", P1, P2", and P3'. Since the current and incoming rectangle drawing objects 260 and 264 are separated from one another, the current rectangle area 264 essentially "bounds" those two rectangle drawing objects so that both current and incoming rectangle drawing objects 260 and 262 are contained within the current rectangle area 264 corresponding to an updated current rectangle drawing object.

With the benefit of the present disclosure, multiple rectangle drawing objects can be continuously rendered, without requiring order generation for each individual rectangle drawing object. Namely, two or more rectangle drawing objects can be rendered to the same one-line raster image buffer storing one-line raster image data. Further, a clip region corresponding to the rectangle drawing objects may be generated by using scanlines associated with individual rectangle drawing objects. As described above, both the one-line raster image data and the clip region may be continuously updated as more rectangle drawing objects come in for processing.

Figure 23:
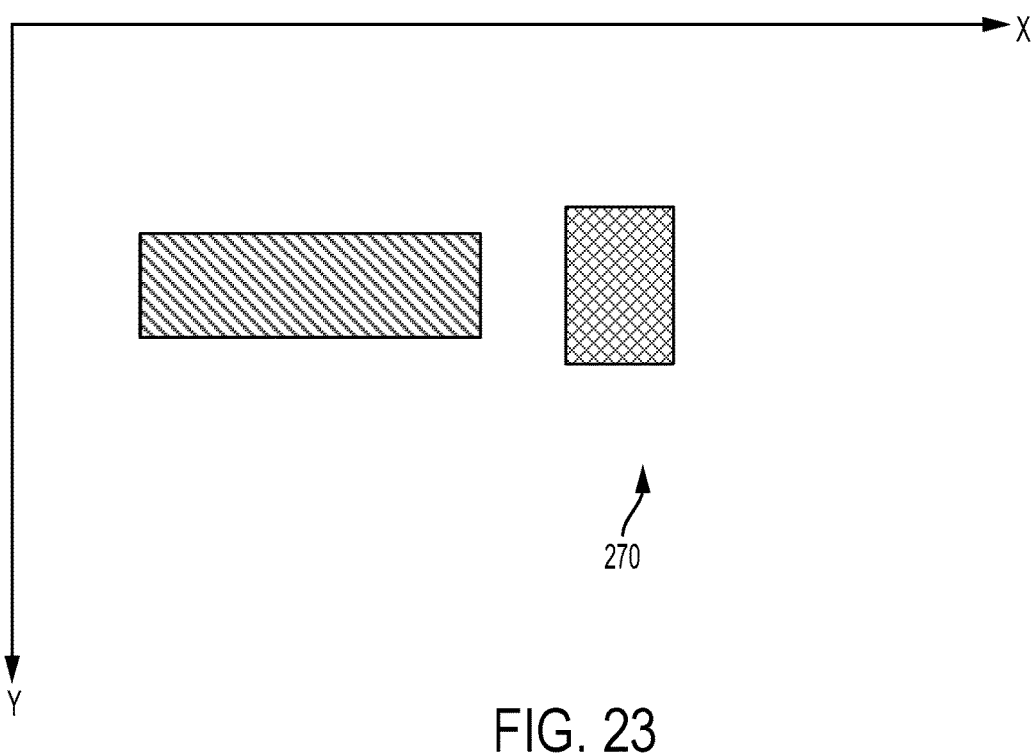
FIG. 23 illustrates an example of a printed image produced using the one-line raster image of FIG. 9 and the clip region of FIG. 10.

Then, the one-line raster image data may be used together with the clip region to fill a single clipped drawing region corresponding to multiple rectangle drawing objects. Hence, order generation time and printing speed can be improved. By way of example, FIG. 23 illustrates an example of a printed image 270 produced using the one-line raster image 106 of FIG. 9 and the clip region 108 of FIG. 10.

5. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method for rendering rectangle drawing objects, comprising:
   receiving, by at least one processor, print data including data representing a plurality of rectangle drawing objects, the plurality of rectangle drawing objects including at least a first rectangle drawing object and a second rectangle drawing object;
   determining, by the at least one processor, if the first rectangle drawing object and the second rectangle drawing object satisfy a predetermined condition;
   if the predetermined condition is satisfied,
      (i) generating, by the at least one processor, one-line raster image data associated with the first and second rectangle drawing objects, and storing, by the at least one processor, the one-line raster image data in a data buffer, wherein the one-line raster image data indicates a first filling color of the first rectangle drawing object over a first extent along a first direction and a second filling color of the second rectangle drawing object over a second extent in the first direction, and
      (ii) generating, by the at least one processor, a clip region corresponding to the first and second rectangle drawing objects;
   using, by the at least one processor, the one-line raster image data together with the clip region to fill a clipped drawing region corresponding to the first and second rectangle drawing objects, the clipped drawing region being filled along a second direction that is perpendicular to the first direction;
   producing, by the at least one processor, one-line printing image data based on the one-line raster image data; and
   printing, by the at least one processor, the first and second rectangle drawing objects using the one-line printing image data.

2. The method of claim 1, wherein generating the one-line raster image data associated with the first and second drawing objects includes:
   generating a first one-line raster image data associated with the first rectangle drawing object,
   generating a second one-line raster image data associated with the second rectangle drawing object; and
   merging the first one-line raster image data and the second one-line raster image data in the data buffer to generate a merged one-line raster image data, the merged one-line raster image data being the one-line raster image data associated with the first and second rectangle drawing objects.

3. The method of claim 1, wherein generating a clip region corresponding to the first and second rectangle drawing objects includes:
   generating a first clip region corresponding to the first rectangle drawing object;
   generating a second clip region corresponding to the second rectangle drawing object; and
   merging the first clip region and the second clip region to generate the clip region corresponding to the first and second rectangle drawing objects.

4. The method of claim 3, wherein:
   generating the first clip region includes rendering the first rectangle drawing object to a first plurality of scanlines;
   generating the second clip region includes rendering the second rectangle drawing object to a second plurality of scanlines; and
   merging the first clip region and the second clip region includes merging the first plurality of scanlines with the second plurality of scanlines.

5. The method of claim 4, wherein:
   respective parameters associated with the first plurality of scanlines and the second plurality of scanlines are stored in a scanline table, the scanline table comprising a second data buffer, and
   the first plurality of scanlines and the second plurality of scanlines are merged in the scanline table.

6. The method of claim 3, wherein merging the first plurality of scanlines with the second plurality of scanlines includes updating a first scanline out of the first plurality of scanlines to include a second scanline out of the second plurality of scanlines.

7. The method of claim 1, wherein the predetermined condition holds that:
   the first rectangle drawing object and the second rectangle drawing object are parallel with respect to the first direction,
   along the second direction, a first length of the first rectangle drawing object is equal to or smaller than a second length of the second rectangle drawing object, and
   the first rectangle drawing object and the second rectangle drawing object are connected or overlap each other in the first direction.

8. The method of claim 7, wherein:
   the first length corresponds to a first height of the first rectangle drawing object,
   the second length corresponds to a second height of the second rectangle drawing object,
   the first direction is defined as a horizontal direction, and the second direction is defined as a vertical direction.

9. The method of claim 7, wherein:
the first length corresponds to a first width of the first rectangle drawing object,
the second length corresponds to a second width of the second rectangle drawing object,
the first direction is defined as a vertical direction, and
the second direction is defined as a horizontal direction.

10. The method of claim 1, wherein the predetermined condition holds that:
the first rectangle drawing object and the second rectangle drawing object are parallel with respect to the first direction,
along the second direction, an overlap exists between an extent of the first rectangle drawing object and an extent of the second rectangle drawing object, and
the first rectangle drawing object and the second rectangle drawing object are not connected and do not overlap each other in the first direction.

11. The method of claim 10, wherein:
the first direction is defined as a horizontal direction, and
the second direction is defined as a vertical direction.

12. The method of claim 10, wherein:
the first direction is defined as a vertical direction, and
the second direction is defined as a horizontal direction.

13. The method of claim 1, wherein the clipped drawing region covers an area corresponding to the clip region.

14. The method of claim 1, wherein:
the first extent corresponds to a first number of pixels,
the second extent corresponds to a second number of pixels, and
the one-line raster image data includes color data for each of the first number of pixels and the second number of pixels for a single raster image line that is one-pixel wide.

15. The method of claim 1, wherein:
the first filling color is represented by first pixel color data,
the second filling color is represented by second pixel color data, and
the one-line raster image data includes the first pixel color data and the second pixel color data, the first pixel color data and the second pixel color data being used to produce one-line printing image data.

16. The method of claim 1,
wherein printing, by the at least one processor, the first and second rectangle drawing objects using the one-line printing image data comprises generating one or more commands to fill a rectangle drawing region using the one-line printing image data.

17. The method of claim 1, wherein the plurality of rectangle drawing objects further includes a third rectangle drawing object, the method further comprising:
merging, by the at least one processor, the first rectangle drawing object with the second rectangle drawing object to obtain a current rectangle drawing object;
determining, by the at least one processor, if the third rectangle drawing object and the current rectangle drawing object satisfy the predetermined condition;
if the predetermined condition is satisfied,
(i) generating, by the at least one processor, one-line raster image data associated with the third rectangle drawing object and merging, by the at least one processor, in the data buffer, the one-line raster image data associated with the third rectangle drawing object with the one-line raster image data associated with the first and second rectangle drawing objects to generate a merged one-line raster image data, wherein the one-line raster image associated with the third rectangle drawing object indicates a third filling color of the third rectangle drawing object over a third extent in the first direction,
(ii) generating, by the at least one processor, a clip region corresponding to the third rectangle drawing object, and
(iii) generating, by the at least one processor, an updated clip region by merging the clip region corresponding to the first and second rectangle drawing objects with the clip region corresponding to the third rectangle drawing object,
wherein,
the merged one-line raster image data is used together with the updated clip region to fill the updated clipped drawing region corresponding to the first, second, and third rectangle drawing objects, the updated clipped drawing region being filled along the second direction.

18. An apparatus, comprising:
at least one processor;
memory; and
program instructions that are stored in the memory and, when executed by the at least one processor, cause the at least one processor to perform functions including:
receiving print data including data representing a plurality of rectangle drawing objects, the plurality of rectangle drawing objects including at least a first rectangle drawing object and a second rectangle drawing object,
determining if the first rectangle drawing object and the second rectangle drawing object satisfy a predetermined condition,
if the predetermined condition is satisfied,
(i) generating one-line raster image data associated with the first and second rectangle drawing objects, and storing the one-line raster image data in a data buffer, wherein the one-line raster image data indicates a first filling color of the first rectangle drawing object over a first extent along a first direction and a second filling color of the second rectangle drawing object over a second extent in the first direction, and
(ii) generating a clip region corresponding to the first and second rectangle drawing objects,
using the one-line raster image data together with the clip region to fill a clipped drawing region corresponding to the first and second rectangle drawing objects, the clipped drawing region being filled along a second direction that is perpendicular to the first direction,
producing one-line printing image data based on the one-line raster image data, and
printing the first and second rectangle drawing objects using the one-line printing image data.

19. The apparatus of claim 18, wherein generating the one-line raster image data associated with the first and second drawing objects includes:
generating a first one-line raster image data associated with the first rectangle drawing object,
generating a second one-line raster image data associated with the second rectangle drawing object; and
merging the first one-line raster image data and the second one-line raster image data in the data buffer to generate a merged one-line raster image data, the merged one-line raster image data being the one-line raster image data associated with the first and second rectangle drawing objects.

20. A non-transitory computer-readable medium having stored thereon program instructions that, when executed by at least one processor, cause the at least one processor to:
receiving print data including data representing a plurality of rectangle drawing objects, the plurality of rectangle drawing objects including at least a first rectangle drawing object and a second rectangle drawing object;
determining if the first rectangle drawing object and the second rectangle drawing object satisfy a predetermined condition;
if the predetermined condition is satisfied,
(i) generating one-line raster image data associated with the first and second rectangle drawing objects, and storing the one-line raster image data in a data buffer, wherein the one-line raster image data indicates a first filling color of the first rectangle drawing object over a first extent along a first direction and a second filling color of the second rectangle drawing object over a second extent in the first direction, and
(ii) generating a clip region corresponding to the first and second rectangle drawing objects; and
using the one-line raster image data together with the clip region to fill a clipped drawing region corresponding to the first and second rectangle drawing objects, the clipped drawing region being filled along a second direction that is perpendicular to the first direction;
producing one-line printing image data based on the one-line raster image data; and
printing the first and second rectangle drawing objects using the one-line printing image data.

* * * * *